United States Patent
Miyamoto

(10) Patent No.: US 9,361,500 B2
(45) Date of Patent: Jun. 7, 2016

(54) IMAGE PROCESSING APPARATUS, IMAGE PROCESSING METHOD, AND RECORDING MEDIUM

(71) Applicant: CASIO COMPUTER CO., LTD, Shibuya-ku (JP)

(72) Inventor: Naotomo Miyamoto, Nerima-ku (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 14/455,555

(22) Filed: Aug. 8, 2014

(65) Prior Publication Data

US 2015/0041543 A1  Feb. 12, 2015

(30) Foreign Application Priority Data

Aug. 8, 2013  (JP) .................................. 2013-164747

(51) Int. Cl.
*G06K 7/10* (2006.01)
*G06K 7/14* (2006.01)

(52) U.S. Cl.
CPC .......... *G06K 7/1443* (2013.01); *G06K 7/10722* (2013.01); *G06K 7/1452* (2013.01)

(58) Field of Classification Search
CPC .... G06Q 30/02; G06Q 20/341; G07F 7/1008; G06K 7/10722; G06K 7/14; G06K 17/00; G06K 7/10693; B42D 15/10
USPC ............ 235/382, 382.5, 375, 462.11, 462.13, 235/487, 454
See application file for complete search history.

(56) References Cited

U.S. PATENT DOCUMENTS

| 8,186,594 B2 | 5/2012 | Uzawa et al. | |
|---|---|---|---|
| 2009/0221880 A1* | 9/2009 | Soderberg | A61B 5/00 600/300 |
| 2009/0302115 A1 | 12/2009 | Dowling | |

FOREIGN PATENT DOCUMENTS

| JP | 06-502036 | 3/1994 |
|---|---|---|
| JP | 2002-197410 | 7/2002 |
| JP | 2006-107034 | 4/2006 |
| JP | 2007-118316 | 5/2007 |
| JP | 2009-129410 | 6/2009 |
| JP | 2010-120313 | 6/2010 |
| JP | 4777041 | 7/2011 |
| JP | 2011-183808 | 9/2011 |
| JP | 2013-009387 | 1/2013 |
| JP | 2013-502634 | 1/2013 |

* cited by examiner

Primary Examiner — Karl D Frech
(74) Attorney, Agent, or Firm — Cozen O'Connor

(57) ABSTRACT

An image processing apparatus includes: an obtaining unit configured to obtain an imprint image where an imprint is captured, the imprint having code information added to a frame portion; an identifying unit configured to identify a frame image area as a read area where the code information is read, the frame image area corresponding to an imprint of the frame portion in the imprint image obtained by the obtaining unit; and a reading unit configured to read the code information from the read area identified by the identifying unit.

24 Claims, 16 Drawing Sheets

Ia

Ie

Ie

Ie

Ie

Ia

Ia

Ib

Ic

ID
IMAGE PROCESSING APPARATUS, IMAGE PROCESSING METHOD, AND RECORDING MEDIUM

BACKGROUND OF THE INVENTION

1. Technical Field

The present invention relates to an image processing apparatus, an image processing method, and a program.

2. Description of the Related Art

Conventionally, there is known an apparatus that generates code information where predetermined information is encoded into a regular arrangement of a set of pixels (U.S. Pat. No. 8,186,594 B2).

Code information is captured, for example, by an imaging apparatus such as a mobile phone or a smartphone, with the code information formed on a recording medium such as paper. The imaging apparatus performs a predetermined decoding process on image information of the captured code information, and thereby obtains original predetermined information represented by the code information.

BRIEF SUMMARY OF THE INVENTION

According to the present invention, a frame portion can be properly detected from an image where an imprint is captured.

According to an embodiment of the present invention, there is provided an image processing apparatus including: an obtaining unit configured to obtain an imprint image where an imprint is captured, the imprint having code information added to a frame portion; an identifying unit configured to identify a frame image area as a read area where the code information is read, the frame image area corresponding to an imprint of the frame portion in the imprint image obtained by the obtaining unit; and a reading unit configured to read the code information from the read area identified by the identifying unit.

According to an embodiment of the present invention, there is provided an image processing method using an image processing apparatus, the method including the steps of: obtaining an imprint image where an imprint is captured, the imprint having code information added to a frame portion; identifying a frame image area as a read area where the code information is read, the frame image area corresponding to an imprint of the frame portion in the obtained imprint image; and reading the code information from the identified read area.

According to an embodiment of the present invention, there is provided a non-transitory computer readable recording medium recording a program that causes a computer of an image processing apparatus to function as: an obtaining unit configured to obtain an imprint image where an imprint is captured, the imprint having code information added to a frame portion; an identifying unit configured to identify a frame image area as a read area where the code information is read, the frame image area corresponding to an imprint of the frame portion in the imprint image obtained by the obtaining unit; and a reading unit configured to read the code information from the read area identified by the identifying unit.

DETAILED DESCRIPTION

Specific modes of the present invention will be described below using the drawings. Note, however, that the scope of the invention is not limited to the examples illustrated.

First Embodiment

Figure 1:
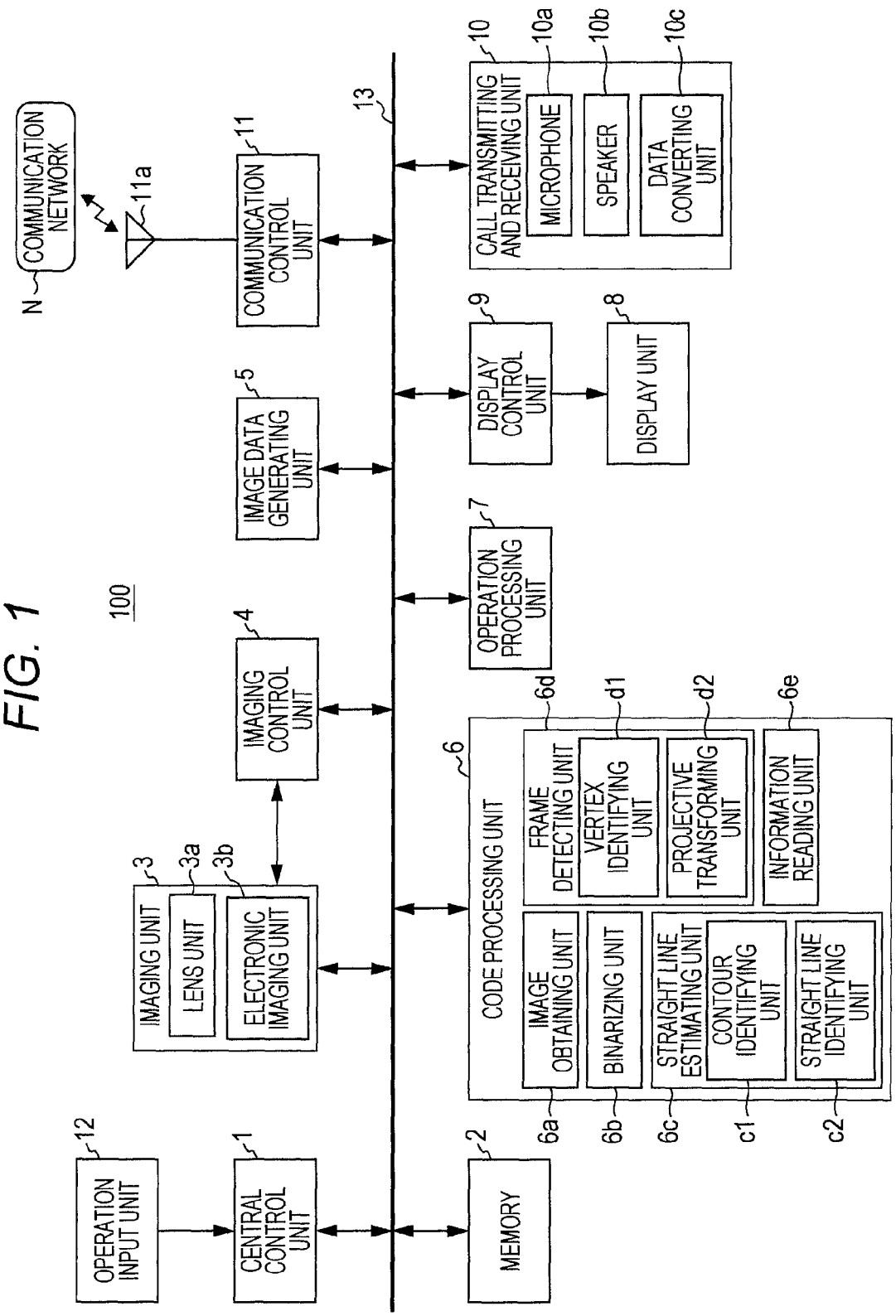
FIG. 1 is a block diagram illustrating a schematic configuration of a portable terminal of a first embodiment to which the present invention is applied.

FIG. 1 is a block diagram illustrating a schematic configuration of a portable terminal 100 of one embodiment to which the present invention is applied.

As illustrated in FIG. 1, the portable terminal 100 includes a central control unit 1, a memory 2, an imaging unit 3, an imaging control unit 4, an image data generating unit 5, a code processing unit 6, an operation processing unit 7, a display unit 8, a display control unit 9, a call transmitting and receiving unit 10, a communication control unit 11, an operation input unit 12, etc.

The central control unit 1, the memory 2, the imaging unit 3, the imaging control unit 4, the image data generating unit 5, the code processing unit 6, the operation processing unit 7, the display control unit 9, the call transmitting and receiving unit 10, and the communication control unit 11 are connected to each other through a bus line 13.

Note that the portable terminal 100 is configured with, for example, an imaging apparatus, a mobile station used in a mobile communication network, such as a mobile phone or a PHS (Personal Handy-phone System), or a PDA (Personal Data Assistant).

The central control unit 1 controls each unit of the portable terminal 100. Specifically, the central control unit 1 includes a CPU (Central Processing Unit; not illustrated) that controls each unit of the portable terminal 100, and performs various types of control operation, according to various types of processing programs (not illustrated) for the portable terminal 100.

The memory 2 is configured with, for example, DRAM (Dynamic Random Access Memory). The memory 2 includes a buffer memory that temporarily stores data, etc., processed by the central control unit 1, the code processing unit 6, etc.; a working memory of the central control unit 1, etc.; a program memory that stores various types of programs and data related to the functions of the portable terminal 100; and the like (none of which are illustrated).

The imaging unit 3 captures an imprint Si (see FIG. 3A) of a stamp S affixed on a recording medium P.

The stamp S is formed such that a polygonal (e.g., square) frame is formed around a predetermined mark for leaving an imprint Si on a recording medium P, and code information Sc where predetermined information is encoded into a regular arrangement of a set of pixels on the frame can be added to a frame portion Sw of the imprint Si.

The imprint Si is left on the recording medium P by the stamp S being affixed on the recording medium P. The frame portion Sw corresponding to the polygonal frame is left around a mark image Sp formed on an imprinting surface.

A plurality of pieces of code information Sc where predetermined information is encoded into a regular arrangement of a set of pixels are added to the frame portion Sw. Namely, the frame portion Sw has pieces of code information Sc added to at least two sides Sa and Sa thereof, respectively, among a plurality of sides Sa, . . . with substantially equal lengths. Specifically, pieces of identical code information Sc are added to four sides Sa, . . . of the substantially square frame portion Sw, respectively, in an orientation such that the pieces of code information Sc are line-symmetric to each other with respect to a diagonal line. That is, multiple pieces of code information Sc are embedded in the imprint Si. In addition, markers Sm of a predetermined shape (e.g., a square shape) used to detect vertices C are added to four corners of the square frame portion Sw, respectively.

Code information Sc is added, for example, in a predetermined orientation on the substantially center side in a width direction of a side Sa of the frame portion Sw, in an extending direction of the side Sa (orthogonal direction substantially orthogonal to the width direction) from a position spaced a predetermined distance from a marker Sm in a predetermined position.

Here, the code information Sc is information where original predetermined information (e.g., a URL) is encoded according to a predetermined coding format (e.g., Reed-Solomon coding or Golay coding). For example, in the code information Sc, a set of white pixels with the pixel value "1" and a set of black pixels with the pixel value "0" are arranged regularly in a predetermined number of dimensions.

Note that in the present embodiment it is assumed that, when the stamp S is affixed on the recording medium P, the stamp S is affixed such that force is not substantially uniformly applied to the entire imprinting surface. Hence, for example, a portion (e.g., a lower portion in FIG. 4A) of a frame portion Sw of an imprint Si bulges and a portion (e.g., an upper left portion as you face it in FIG. 4A) of the imprint Si is faint.

The imaging unit 3 includes a lens unit 3a and an electronic imaging unit 3b.

The lens unit 3a is configured with a plurality of lenses such as a zoom lens and a focus lens.

The electronic imaging unit 3b is configured with, for example, an image sensor such as a CCD (Charge Coupled Device) or a CMOS (Complementary Metal-Oxide Semiconductor), and converts an optical image having passed through various types of lenses in the lens unit 3a into a two-dimensional image signal.

Note that, though not illustrated, the imaging unit 3 may include an iris that adjusts the amount of light passing through the lens unit 3a.

The imaging control unit 4 controls capturing of a subject by the imaging unit 3. Namely, though not illustrated, the imaging control unit 4 includes a timing generator, a driver, etc. The imaging control unit 4 allows the electronic imaging unit 3b to perform scanning drive by the timing generator and the driver such that the electronic imaging unit 3b converts an optical image into a two-dimensional image signal every predetermined cycle, reads a frame image on a screen-by-screen basis from an imaging area of the electronic imaging unit 3b, and outputs the frame image to the image data generating unit 5.

In addition, the imaging control unit 4 controls adjustment of subject imaging conditions such as AF (autofocus process), AE (auto exposure process), and AWB (auto white balance).

The image data generating unit 5 performs, where appropriate, gain adjustment on an analog value signal of a frame image transferred from the electronic imaging unit 3b, on an RGB color component basis, and then, samples and holds the signal by a sample and hold circuit (not illustrated) to convert the signal into digital data by an A/D converter (not illustrated). Then, the image data generating unit 5 performs, by a color processing circuit (not illustrated), color processing including a pixel interpolation process and a γ correction process on the digital data, and then, generates a luminance signal Y and color-difference signals Cb and Cr (YUV data) which have digital values.

Then, the image data generating unit 5 sequentially outputs generated YUV data of each frame image to the memory 2, and allows the memory 2 to store the YUV data.

The code processing unit 6 includes an image obtaining unit 6a, a binarizing unit 6b, a straight line estimating unit 6c, a frame detecting unit 6d, and an information reading unit 6e.

Note that each unit in the code processing unit 6 is configured with, for example, a predetermined logic circuit, but this configuration is an example and thus is not limited thereto.

The image obtaining unit 6a sequentially obtains a captured image Ia (see FIG. 4A) where an imprint Si affixed on a recording medium P is captured.

Namely, the image obtaining unit 6a obtains a captured image (imprint image) Ia where an imprint Si is captured. The imprint Si has code information Sc added to a frame portion Sw with a predetermined width around a predetermined mark image Sp. Specifically, the image obtaining unit 6a obtains from the memory 2 replication of image data with a predetermined resolution of a captured image Ia generated by the image data generating unit 5 after capturing an imprint Si by the imaging unit 3.

Figure 4A:
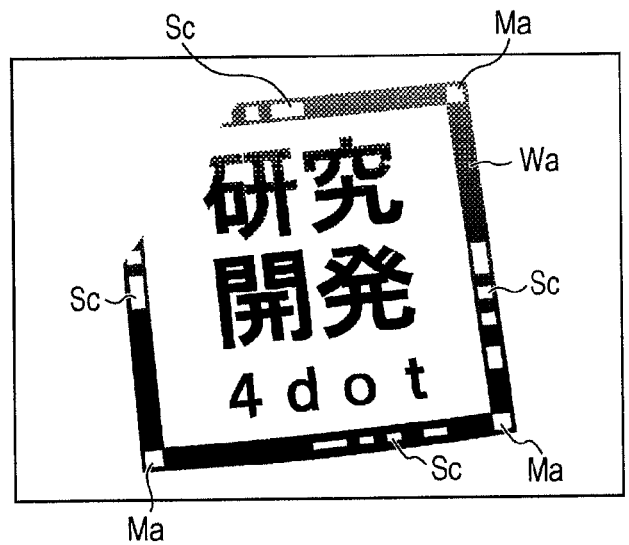
FIGS. 4A to 4C are diagrams schematically illustrating examples of images related to the code reading process of FIG. 2.
Figure 4B:
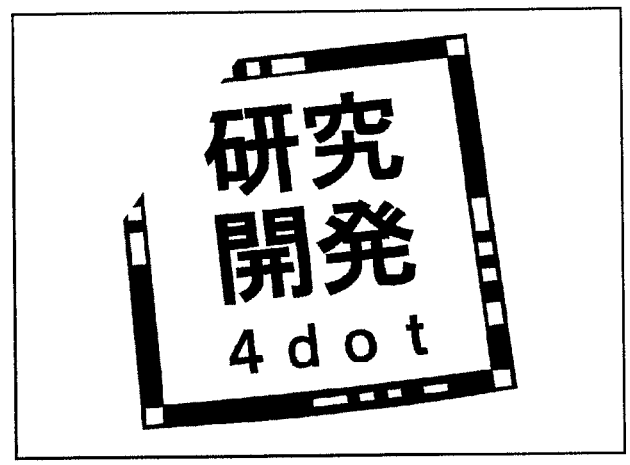

The binarizing unit 6b creates a first binarized image Ib (see FIG. 4B).

Namely, the binarizing unit 6b performs a binarization process where binarization is performed using a predetermined threshold value (e.g., an adaptive binarization process), on a luminance component Y of image data (YUV data) of the captured image Ia obtained by the image obtaining unit 6a, and thereby generates image data of a first binarized image Ib.

Figure 6A:
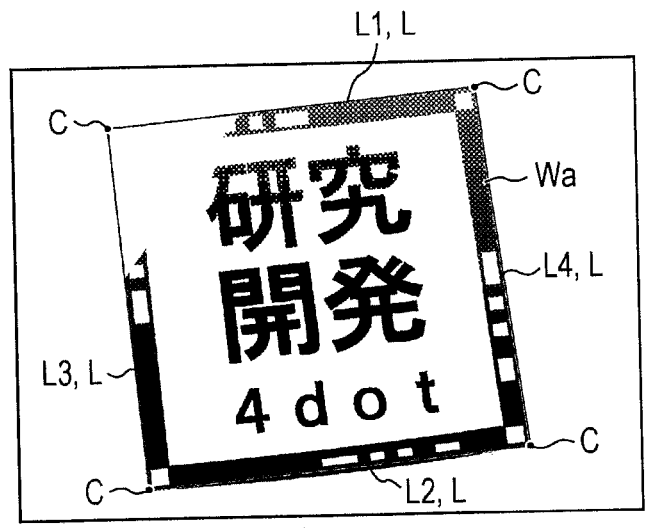
FIGS. 6A to 6C are diagrams schematically illustrating examples of images related to the code reading process of FIG. 2.
Figure 6B:
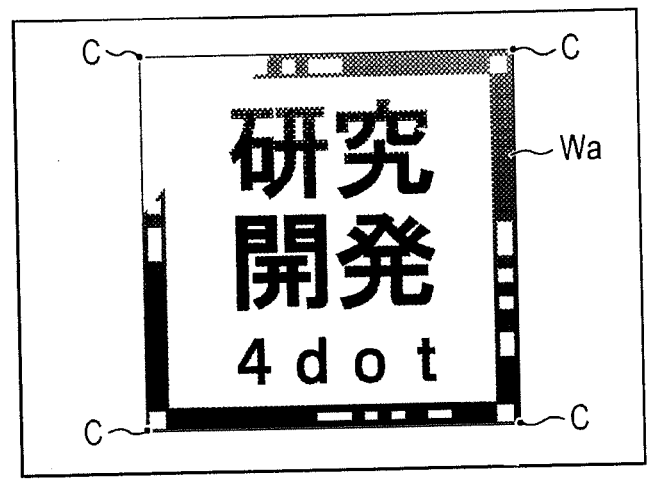
Figure 6C:
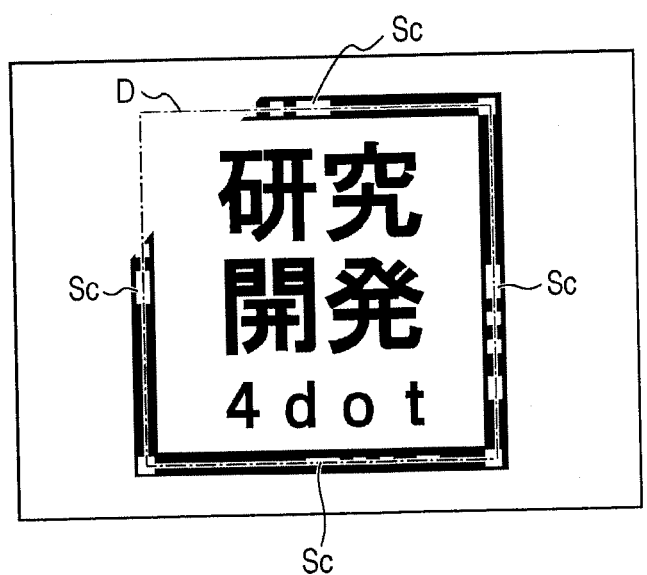

In addition, the binarizing unit 6b creates a second binarized image Id (see FIG. 6C). Namely, the binarizing unit 6b performs a binarization process where binarization is performed using a predetermined threshold value (e.g., an adaptive binarization process), on a luminance component Y of image data (YUV data) of a projective transformed image Ic generated by a projective transforming unit d2 in the frame detecting unit 6d, and thereby generates image data of a second binarized image Id.

Note that the above-described binarization process is a publicly known technique and thus a detailed description thereof is omitted here.

The straight line estimating unit 6c estimates, in the captured image Ia obtained by the image obtaining unit 6a, a predetermined number of straight lines L that form an external contour of the frame portion Sw corresponding to the polygonal frame of the stamp S and that are provided according to the number of corners of the polygonal frame. Specifically, the straight line estimating unit 6c includes a contour identifying unit c1 and a straight line identifying unit c2.

The contour identifying unit c1 identifies a polygonal convex hull area A1 corresponding to the external contour of the frame portion Sw of the imprint Si.

Figure 4C:
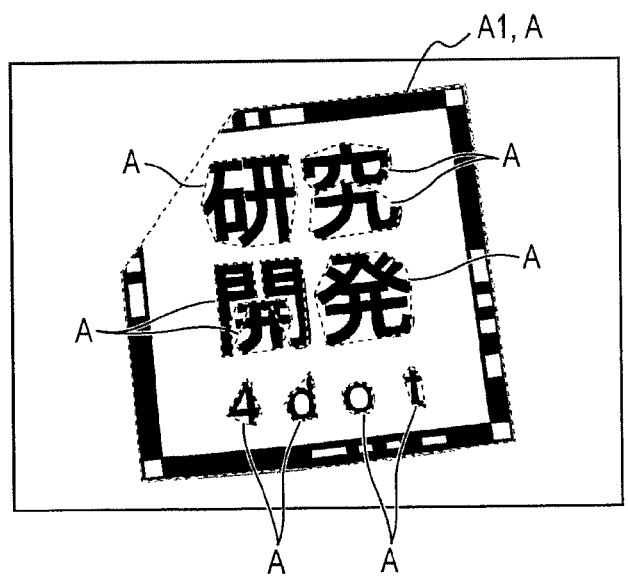

Namely, the contour identifying unit c1 identifies a polygonal convex hull area A1 (see FIG. 4C) corresponding to the external contour of the frame portion Sw of the captured image Ia obtained by the image obtaining unit 6a.

Specifically, the contour identifying unit c1, for example, obtains image data of the first binarized image Ib created by the binarizing unit 6b and corresponding to the captured image Ia, and performs a convex hull process on the image data, and thereby calculates, for each set of black pixels with the pixel value "0" present in a predetermined area, a plurality of line segments that connect pixels forming the outermost contour together. By this, the black pixels with the pixel value "0" present in the predetermined area are enclosed by the plurality of line segments, and a polygonal area configured with the line segments becomes a convex hull area A with no concave portion. At this time, by changing a processing target area in the binarized image, the contour identifying unit c1 forms a plurality of convex hull areas A.

Then, the contour identifying unit c1 identifies a convex hull area A with the largest area among the formed plurality of convex hull areas A, . . . , as a polygonal (e.g., hexagonal) convex hull area A1 corresponding to the external contour of the frame portion Sw of the imprint Si.

Note that the above-described procedure of a convex hull process is an example and thus is not limited thereto and can be arbitrarily changed where appropriate. Note also that the convex hull areas A are a publicly known technique and thus a detailed description thereof is omitted here.

The straight line identifying unit c2 identifies a predetermined number of straight lines L that form an external contour of a frame image Wa corresponding to the frame portion Sw of the imprint Si (see FIG. 6A).

Namely, the straight line identifying unit c2 identifies a predetermined number of straight lines (e.g., four straight lines forming a square external contour) L forming the external contour of the frame image Wa, based on the positions of a plurality of (e.g., six) vertices B, . . . forming the polygonal (e.g., hexagonal) convex hull area A1 identified by the contour identifying unit c1. Specifically, the straight line identifying unit c2 identifies a predetermined number of straight lines L forming the external contour of the frame image Wa, based on at least either one of the number of pixels of each straight line L overlapping the polygonal convex hull area A1 among a plurality of straight lines L, . . . passing through any two vertices B and B forming the polygonal convex hull area A1, and a relative relationship between adjacent straight lines L.

Namely, the straight line identifying unit c2 identifies straight lines L whose numbers of pixels overlapping a plurality of pixels forming the polygonal convex hull area A1 are greater than a predetermined value among a plurality of straight lines L, . . . passing through any two vertices B and B forming the polygonal convex hull area A1 identified by the contour identifying unit c1, and identifies the straight lines L as straight lines L forming the external contour of the frame image Wa.

Figure 5A:
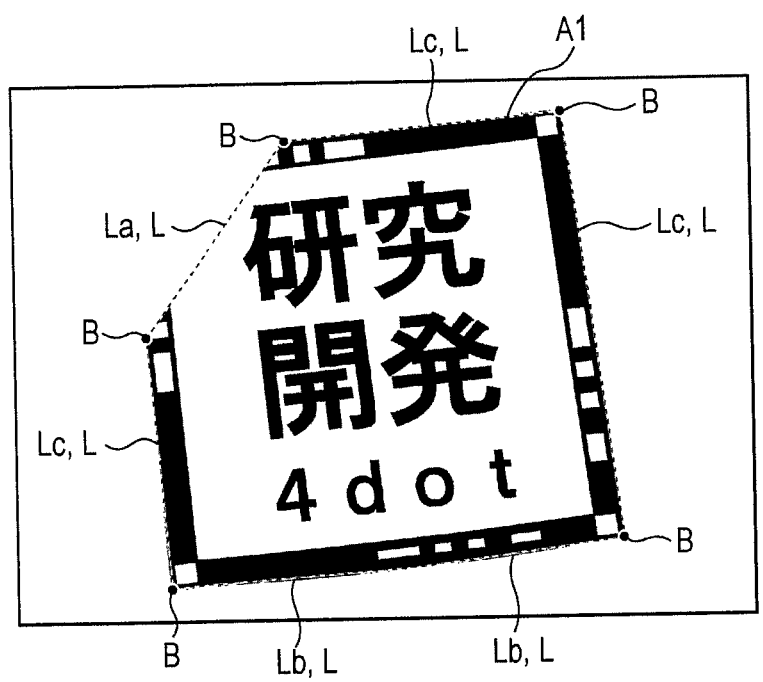
FIGS. 5A and 5B are diagrams schematically illustrating examples of images related to the code reading process of FIG. 2.

Specifically, the straight line identifying unit c2 performs, for example, a straight-line detection process by a RANSAC method on pixels forming the polygonal convex hull area A1 identified by the contour identifying unit c1, and thereby identifies straight lines L forming the external contour of the frame image Wa. For example, the straight line identifying unit c2 selects any two vertices B and B from among five vertices B, . . . forming the convex hull area A1, and identifies a straight line L formed by connecting the two vertices B and B, as a candidate for the straight lines L (candidate straight line L) forming the square external contour of the frame image Wa. Then, the straight line identifying unit c2 calculates, for all of the identified candidate straight lines L, the number of pixels overlapping a plurality of pixels forming the convex hull area A1, and identifies those candidate straight lines L whose calculated numbers of pixels are greater than a predetermined value, as the straight lines L forming the external contour of the frame image Wa. By this, for example, those candidate straight lines Lc other than a candidate straight line La corresponding to a portion where the imprint Si is faint, and relatively short candidate straight lines Lb are identified as the straight lines L forming the external contour of the frame image Wa (see FIG. 5A).

Note that the straight-line detection process by a RANSAC method is a publicly known technique and thus a detailed description thereof is omitted here.

In addition, the straight line identifying unit c2 identifies straight lines L whose angles formed with their adjacent straight lines L are substantially equal to the interior angle of the polygonal frame among a plurality of straight lines L, . . . passing through any two vertices B and B forming the polygonal convex hull area A1 identified by the contour identifying unit c1, calculates an evaluation value for each straight line L by assigning weights to those pixels among the pixels forming the straight line L that overlap the polygonal convex hull area A1, and identifies straight lines L whose calculated evaluation values are high, as the straight lines L forming the external contour of the frame image Wa.

Figure 5B:
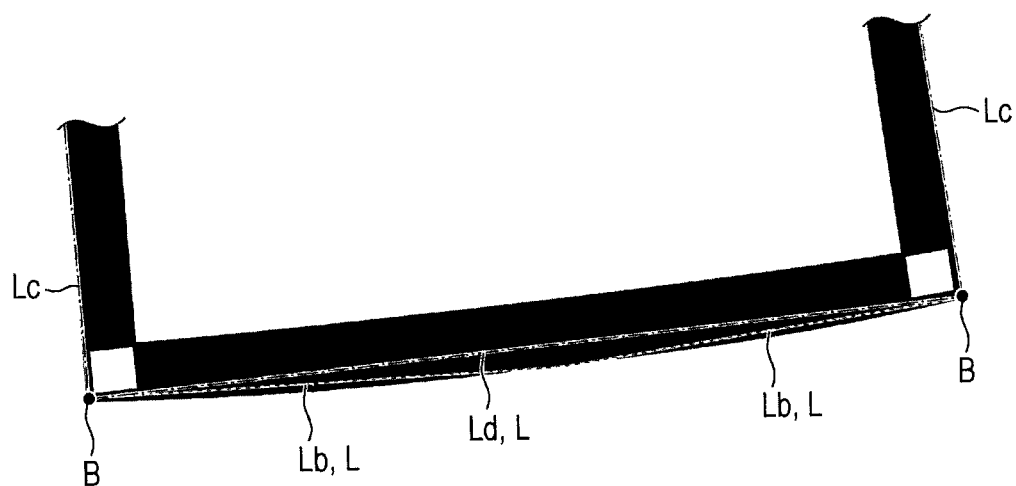

Specifically, the straight line identifying unit c2, for example, identifies, for all candidate straight lines L, candidate straight lines Ld whose angles formed with their adjacent candidate straight lines L are substantially equal to the interior angle (90°) of the square frame of the stamp S. Then, the straight line identifying unit c2 calculates an evaluation value for each candidate straight line L, according to a predetermined arithmetic expression by assigning weights to those pixels among the pixels forming each of the identified candidate straight lines Ld that overlap the polygonal convex hull area A1. For example, in the case in which a portion (e.g., a lower portion in FIG. 5B) of the frame image Wa of the imprint Si bulges, when the straight line identifying unit c2 selects any two vertices B and B from among three vertices B, . . . present at this portion to identify candidate straight lines L, three candidate straight lines L, . . . are identified. Then, the straight line identifying unit c2 calculates angles of each of the three candidate straight lines L, . . . formed with those candidate straight lines L adjacent thereto at each end (in FIG. 5B, two candidate straight lines Lc on the left and right sides indicated by dash-double-dotted lines), and identifies a candidate straight line L whose calculated angles are substantially equal to 90° (in FIG. 5B, a candidate straight line Ld indicated by a dash-dotted line). Furthermore, the straight line identifying unit c2 identifies those pixels among the pixels forming the identified candidate straight line Ld that overlap the polygonal convex hull area A1 (e.g., in FIG. 5B, pixels on both of the left and right end sides), and calculates an evaluation value according to a predetermined arithmetic expression by assigning weights to the identified pixels.

Then, the straight line identifying unit c2 compares the calculated evaluation values of the candidate straight lines L and identifies a candidate straight line Ld with the highest evaluation value as a straight line L forming the external contour of the frame image Wa. For example, the candidate straight line Ld indicated by the dash-dotted line does not have a shape following along an edge of the polygonal convex hull area A1, but since those pixels of the candidate straight line Ld on both of the left and right end sides overlap the polygonal convex hull area A1, the candidate straight line Ld has a higher evaluation value than other candidate straight lines Lb indicated by dashed lines, and thus, is identified as a straight line L forming the external contour of the frame image Wa.

In this manner, the straight line estimating unit 6c estimates four straight lines L, . . . forming the external contour of the frame image Wa corresponding to the square frame of the stamp S, in the captured image Ia (first binarized image Ib). Specifically, the straight line estimating unit 6c estimates a straight line corresponding to the upper side L1, a straight line corresponding to the lower side L2, and a straight line corresponding to the left side L3, and a straight line corresponding to the right side L4, as straight lines L corresponding to the respective upper, lower, left, and right sides of the square (see FIG. 6A).

The frame detecting unit 6d detects the frame image Wa of the captured image Ia of the imprint Si formed by the predetermined number of straight lines L estimated by the straight line estimating unit 6c. Specifically, the frame detecting unit 6d includes a vertex identifying unit d1 and the projective transforming unit d2.

The vertex identifying unit d1 identifies vertices C of the frame image Wa of the captured image Ia (see FIG. 6B).

Namely, the vertex identifying unit d1 identifies a predetermined number of points C where the predetermined number of straight lines L identified by the straight line identifying unit c2 intersect each other, as the vertices C of the frame portion Sw (frame image Wa) of the imprint Si. Specifically, the vertex identifying unit d1 identifies, as the vertices C of the frame image Wa, four points, each of which is formed by adjacent straight lines L intersecting each other among four straight lines L, . . . forming the external contour identified by the straight line identifying unit c2, in the captured image Ia. At this time, for those straight lines L among the four straight lines L, . . . that do not intersect each other (e.g., the straight line corresponding to the upper side L1 and the straight line corresponding to the left side L3), the vertex identifying unit d1 extends at least one of those straight lines L in a predetermined direction and thereby obtains an intersection of those straight lines L.

Then, the frame detecting unit 6d detects the frame image Wa of the captured image Ia, based on the predetermined number of vertices C identified by the vertex identifying unit d1. Namely, the frame detecting unit 6d detects, as the frame portion Sw (frame image Wa) of the imprint Si, an area having the four identified points as its vertices C, . . . .

Note that the vertex identifying unit d1 may identify, in the captured image Ia, the vertices C of the frame portion Sw (frame image Wa), based on the coordinate positions of marker images Ma corresponding to the markers Sm of the imprint Si.

Figure 7A:
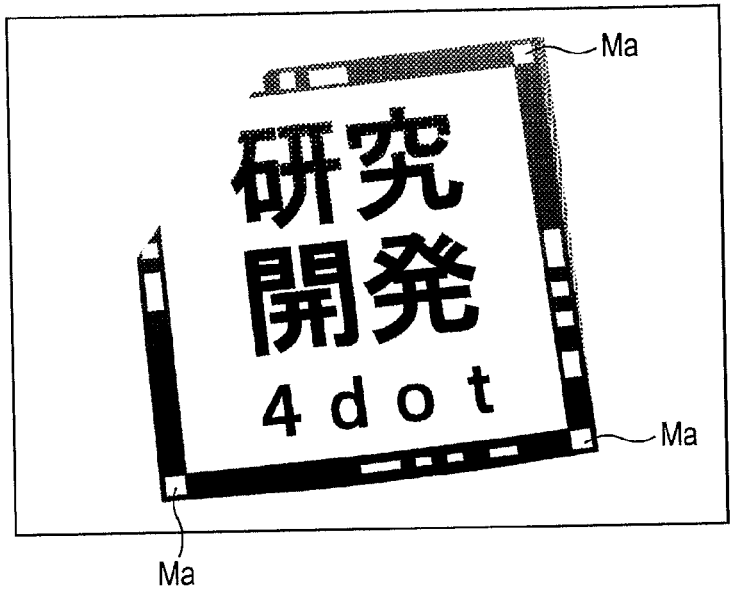
FIGS. 7A to 7C are diagrams schematically illustrating examples of images related to the code reading process of FIG. 2.

Namely, in the case in which, for example, as illustrated in FIG. 7A, a portion (e.g., an upper right portion) of the imprint Si is blurred, when the portion is binarized, the portion becomes black pixels with the pixel value "0". Accordingly, the straight lines L forming the external contour of the frame image Wa may not be able to be properly estimated from the captured image Ia of the imprint Si. Hence, using the fact that the vertices of the polygonal frame are present near (within a predetermined area of) the markers Sm on the imprinting surface, the vertex identifying unit d1 identifies the vertices C of the frame image Wa, taking into account the coordinate positions of the marker images Ma in the captured image Ia.

Figure 7B:
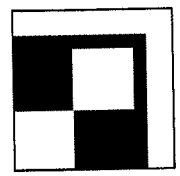
Figure 7C:
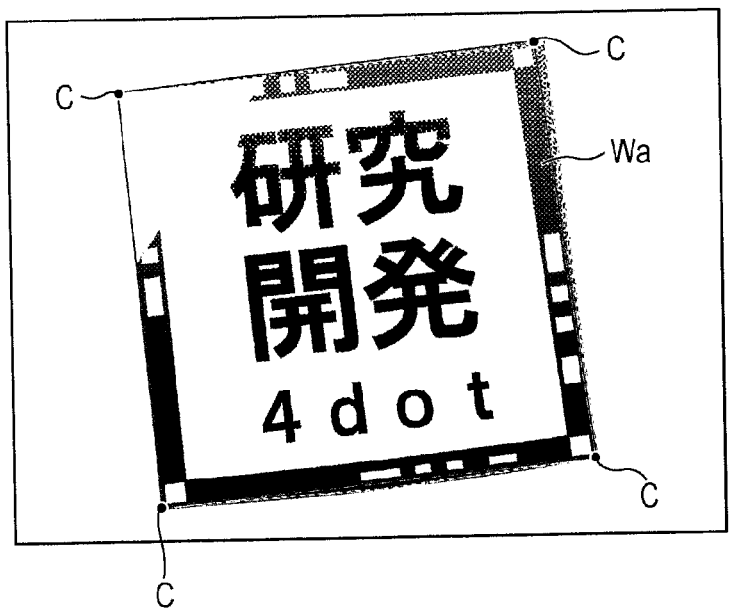

Specifically, the vertex identifying unit d1, for example, prepares a pattern image Pa corresponding to the shape of the markers Sm (see FIG. 7B), and identifies areas including marker images Ma similar to the pattern image Pa in the captured image Ia, using feature information of the pattern image Pa (e.g., SIFT (Scale-Invariant Features Transform) feature quantity). Then, the vertex identifying unit d1 identifies, in the captured image Ia, the vertices C of the frame image Wa from within predetermined areas with reference to the coordinate positions of the marker images Ma. By this, the vertex identifying unit d1 can identify a corresponding vertex C of the frame image Wa from the blurred portion of the imprint Si, enabling to properly detect the frame image Wa of the captured image Ia by the frame detecting unit 6d (see FIG. 7C).

The projective transforming unit d2 performs a projective transformation process for creating a projective transformed image Ic (see FIG. 6B).

Namely, the projective transforming unit d2 performs a projective transformation process on the captured image Ia obtained by the image obtaining unit 6a, based on the predetermined number of vertices C identified by the vertex identifying unit d1, and thereby creates a polygonal projective transformed image Ic. Specifically, the projective transforming unit d2 calculates a coordinate transformation equation that transforms the coordinate positions of four vertices C, . . . of the frame image Wa forming a quadrangle with a distorted outline which are identified by the vertex identifying unit d1 into the coordinate positions of four vertices C, . . . of a square. Then, the projective transforming unit d2 performs a projective transformation process on the captured image Ia of the imprint Si, according to the calculated coordinate transformation equation, and thereby generates a projective transformed image Ic where the outline of the frame image Wa corresponding to the frame portion Sw of the imprint Si is transformed into a square shape.

Then, the frame detecting unit 6d detects the square frame portion Sw (frame image Wa) corresponding to the frame of the stamp S, in the projective transformed image Ic (captured polygonal image) created by the projective transforming unit d2.

Note that the above-described projective transformation process is a publicly known technique and thus a detailed description thereof is omitted here.

The information reading unit 6e performs a reading process for reading original predetermined information from the code information Sc.

Namely, the information reading unit 6e reads predetermined information from the code information Sc in the frame portion Sw (frame image Wa) of the captured image Ia of the imprint Si which is detected by the frame detecting unit 6d. Specifically, the information reading unit 6e reads predetermined information from the code information Sc in the frame image Wa of the second binarized image Id corresponding to the projective transformed image Ic created by the projective transforming unit d2.

For example, the information reading unit 6e detects, in the second binarized image Id, two substantially parallel edges forming the frame image Wa which are detected by the frame detecting unit 6d, and identifies a line of a predetermined shape (e.g., a square shape) formed by connecting the midpoints of the two edges, as a read area D for the code information Sc (see FIG. 6C). Then, the information reading unit 6e performs scanning in a predetermined direction from a predetermined position (e.g., an upper left corner portion) of the read area D to identify coordinate positions where a set of white pixels with the pixel value "1" and a set of black pixels with the pixel value "0" are present. The information reading unit 6e performs a decoding process appropriate to an encoding scheme used for the code information Sc, on an arrangement of the identified set of white pixels and set of black pixels, and thereby reads original predetermined information (e.g., a URL) represented by the code information Sc.

At this time, the information reading unit 6e performs a reading process on an area-by-area basis, each area corresponding to a side Sa of the frame portion Sw in the read area D. That is, reading of original predetermined information from the code information Sc is performed a number of times (e.g., four times) according to the number of sides Sa of the frame portion Sw. Here, since pieces of identical code information Sc are added to the sides Sa of the frame portion Sw, respectively, the information reading unit 6e may be configured such that, for example, when a plurality of pieces of original predetermined information are read as a result of being detected at two or more locations, the information reading unit 6e determines that the predetermined information has been able to be read properly.

Note that the above-described reading process is a publicly known technique and thus a detailed description thereof is omitted here.

The operation processing unit 7 performs predetermined operation, according to the original predetermined information of the code information Sc read by the information reading unit 6e.

Namely, when the information reading unit 6e has read a predetermined number or more of pieces of the identical code information, the operation processing unit 7 controls performance of processes for the predetermined information. Specifically, for example, when a URL is read as predetermined information, the operation processing unit 7 controls the communication control unit 11 to access a specific page on the Internet which is specified by the obtained URL. Then, the operation processing unit 7 controls the display control unit 9, the call transmitting and receiving unit 10, etc., to perform various types of processes, according to the instructions to perform various types of processes set in advance (e.g., playback of specific audio and images).

The display unit 8 is configured with, for example, a liquid crystal display panel, and displays an image (e.g., a live view image) captured by the imaging unit 3 on a display screen, based on a video signal from the display control unit 9.

The display control unit 9 performs control to read display image data which is temporarily stored in the memory 2, and allow the display unit 8 to perform display.

Specifically, the display control unit 9 includes VRAM (Video Random Access Memory), a VRAM controller, a digital video encoder, etc. The digital video encoder reads a luminance signal Y and color-difference signals Cb and Cr which are read from the memory 2 and stored in the VRAM (not illustrated) under the control of the central control unit 1, at a predetermined playback frame rate (e.g., 30 fps) from the VRAM through the VRAM controller, generates a video signal based on these data, and outputs the video signal to the display unit 8.

For example, the display control unit 9 allows the display unit 8 to perform live view display while sequentially updating, at a predetermined display frame rate, a plurality of frame images, . . . which are captured by the imaging unit 3 and the imaging control unit 4 and are created by the image data generating unit 5.

The call transmitting and receiving unit 10 performs a call with an external user of an external device connected thereto through a communication network N.

Specifically, the call transmitting and receiving unit 10 includes a microphone 10a, a speaker 10b, a data converting unit 10c, etc. The call transmitting and receiving unit 10 allows the data converting unit 10c to perform an A/D conversion process on user's transmitting audio which is inputted from the microphone 10a, and output transmitting audio data to the central control unit 1, and allows the data converting unit 10c to perform a D/A conversion process on audio data such as receiving audio data which is outputted from the communication control unit 11 and inputted thereto under the control of the central control unit 1, and output the audio data from the speaker 10b.

The communication control unit 11 performs transmission and reception of data through the communication network N and a communication antenna 11a.

Namely, the communication antenna 11a is an antenna capable of performing transmission and reception of data compliant with a predetermined communication scheme (e.g., a W-CDMA (Wideband Code Division Multiple Access) scheme or a GSM (Global System for Mobile Communications; registered trademark) scheme) which is adopted by the portable terminal 100 for communication with a wireless base station (not illustrated). The communication control unit 11 performs transmission and reception of data with the wireless base station through the communication antenna 11a, according to a communication protocol for the predetermined communication scheme, using a communication channel set by the communication scheme. That is, the communication control unit 11 transmits and receives to/from an external device, which is a communication counterpart, audio generated during a call with an external user of the external device or transmits and receives data of email to/from the external device, based on instruction signals outputted from the central control unit 1 and inputted thereto.

Note that the configuration of the communication control unit 11 is an example and thus is not limited thereto and can be arbitrarily changed where appropriate. For example, though not illustrated, the configuration may be such that a wireless LAN module is mounted on the communication control unit 11 so that the communication control unit 11 can access the communication network N through an access point.

The communication network N is, for example, a communication network that connects the portable terminal 100 to an external device through a wireless base station, a gateway server (not illustrated), etc.

In addition, the communication network N is, for example, a communication network constructed using a dedicated line or an existing general public line, and various line modes such as a LAN (Local Area Network) and a WAN (Wide Area Network) can be applied. The communication network N includes, for example, various types of communication networks such as a telephone network, an ISDN network, a dedicated line, a mobile communication network, a communication satellite line, and a CATV network, an IP network, a VoIP (Voice over Internet Protocol) gateway, and an Internet service provider.

The operation input unit 12 is to input various types of instructions to a terminal main body.

Specifically, the operation input unit 12 includes various types of buttons (none of which are illustrated) such as a shutter button related to an instruction to shoot a subject, up/down/left/right cursor buttons and an enter button related to an instruction to select a mode, a function, etc., communication-related buttons related to an instruction to perform sending and receiving of telephone calls, transmission and reception of email, etc., and numeric buttons and symbol buttons related to an instruction to input text.

When various types of buttons are operated by a user, the operation input unit 12 outputs an operation instruction according to the operated button to the central control unit 1. The central control unit 1 allows each unit to perform predetermined operation (e.g., capturing of a subject, sending or receiving of a telephone call, or transmission or reception of email), according to the operation instruction outputted from the operation input unit 12 and inputted thereto.

Note that the operation input unit 12 may have a touch panel integrally formed with the display unit 8, and may output, based on a user's predetermined operation on the touch panel, an operation instruction according to the predetermined operation to the central control unit 1.

<Code Reading Process>

Next, a code reading process by the portable terminal 100 will be described with reference to FIGS. 2 to 7A to 7C.

Figure 2:
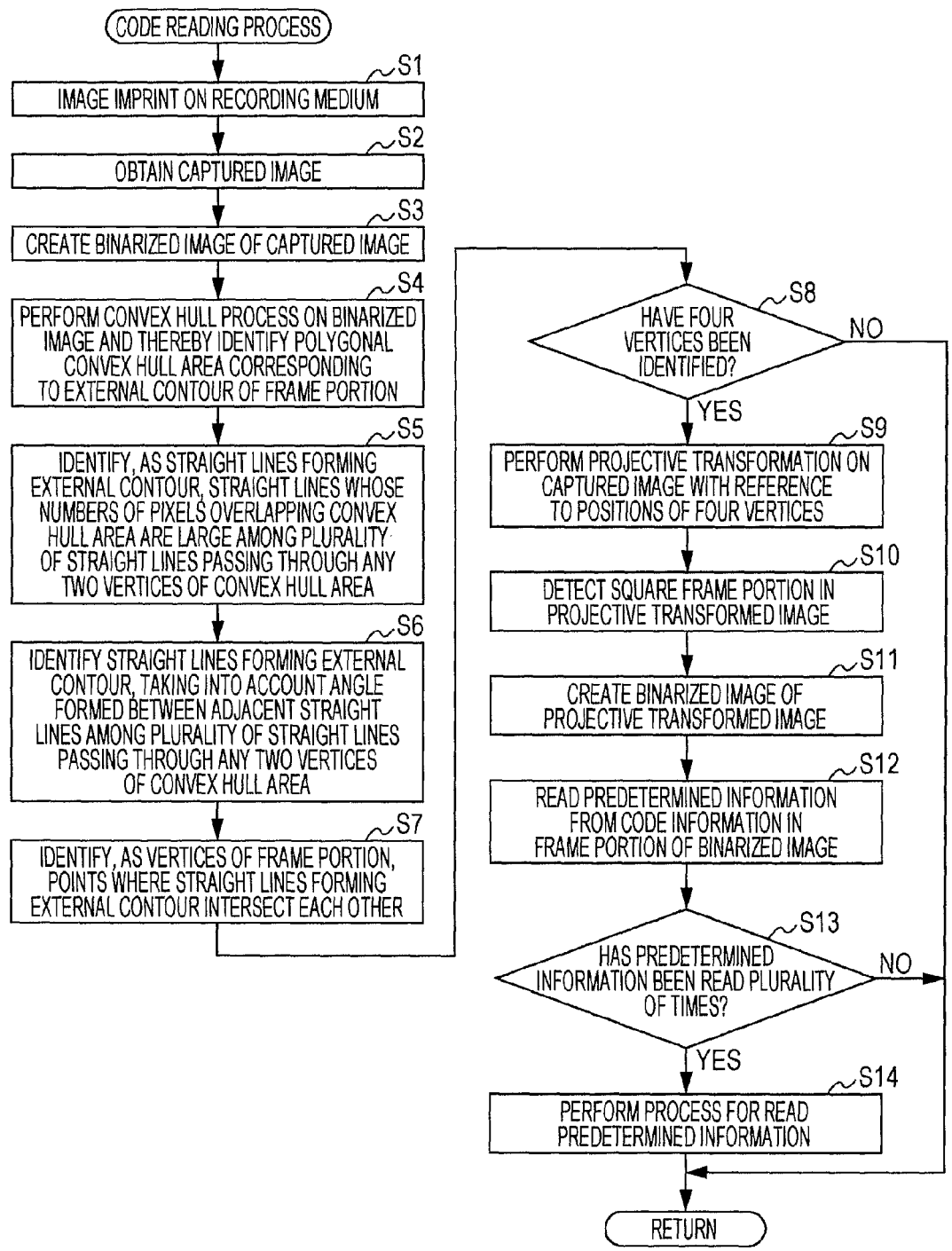
FIG. 2 is a flowchart illustrating an example of operation related to a code reading process by the portable terminal of FIG. 1.

FIG. 2 is a flowchart illustrating an example of operation related to a code reading process.

Figure 3A:
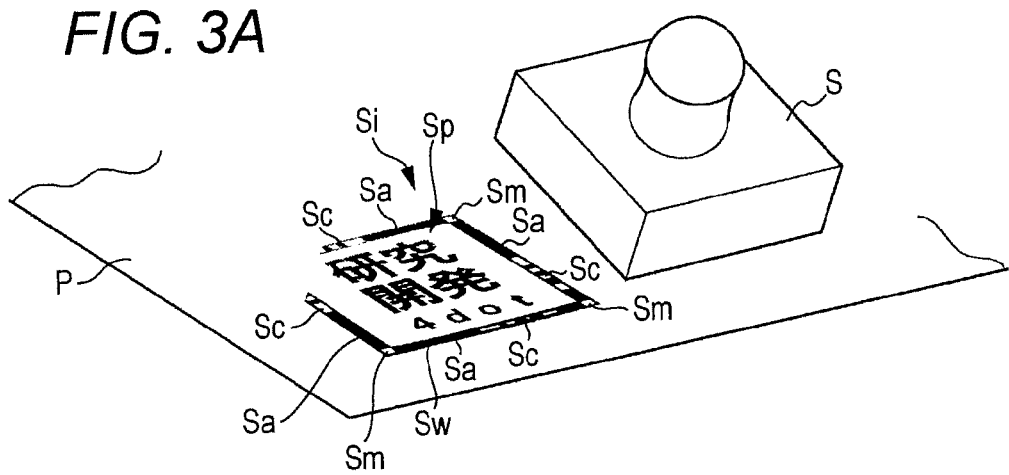
FIGS. 3A and 3B are diagrams for describing the code reading process of FIG. 2.

Note that it is assumed that an imprint Si captured in the following code reading process is affixed, for example, in a predetermined position on a recording medium P such as a postcard (see FIG. 3A). Note also that it is assumed that pieces of identical code information Sc are added to sides Sa of a frame portion Sw of the imprint Si, respectively.

Figure 3B:
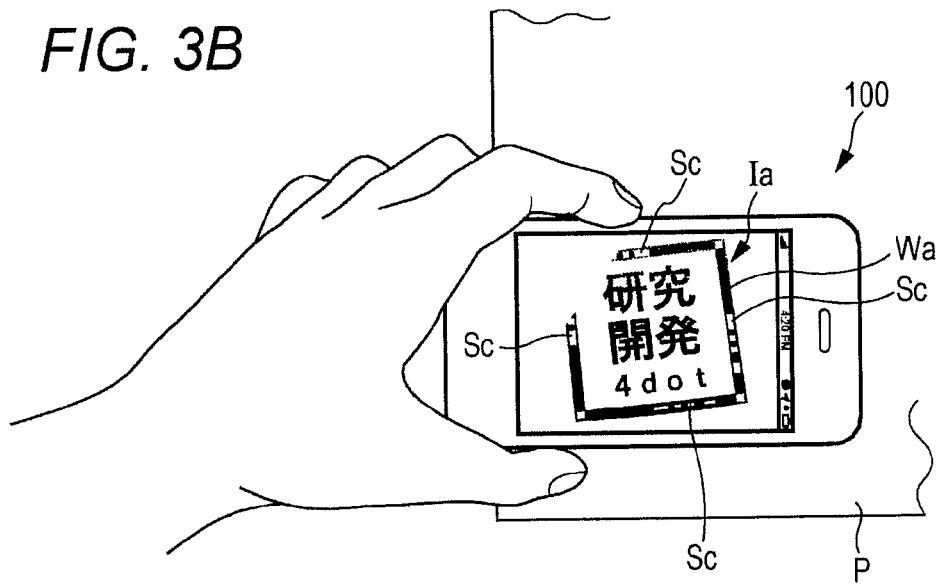

As illustrated in FIG. 2, first, when an imaging instruction is inputted based on a user's predetermined operation on the operation input unit 12, the imaging control unit 4 allows the imaging unit 3 to capture an imprint Si, and the image data generating unit 5 generates image data of a captured image Ia transferred from the electronic imaging unit 3b (step S1; see FIG. 3B).

Then, the image data generating unit 5 outputs the generated YUV data of the captured image Ia to the memory 2, and allows the memory 2 to store the YUV data.

Note that in order to facilitate capturing of the imprint Si closer to a square shape, the display control unit 9 may allow the display unit 8 to display a guide corresponding to the outline of the imprint Si.

Then, the image obtaining unit 6a in the code processing unit 6 obtains from the memory 2 the image data (e.g., luminance data) with a predetermined resolution of the captured image Ia generated by the image data generating unit 5 (step S2; see FIG. 4A). Subsequently, the binarizing unit 6b performs a binarization process where binarization is performed using a predetermined threshold value, on the image data of the captured image Ia obtained by the image obtaining unit 6a, and thereby generates image data of a first binarized image Ib (see FIG. 4B) (step S3).

Then, the contour identifying unit c1 in the straight line estimating unit 6c performs a convex hull process on the image data of the first binarized image Ib generated by the binarizing unit 6b, and thereby identifies a polygonal convex hull area A1 corresponding to the external contour of the frame portion Sw (see FIG. 4C) (step S4). Specifically, the contour identifying unit c1 identifies a convex hull area A with the largest area among a plurality of convex hull areas A, . . . formed by the convex hull process, as the polygonal (e.g., hexagonal) convex hull area A1 corresponding to the external contour of the frame portion Sw of the imprint Si.

Subsequently, the straight line identifying unit c2 identifies, as straight lines L forming the external contour of a frame image Wa corresponding to the frame portion Sw, straight lines L whose numbers of pixels overlapping a plurality of pixels forming the polygonal convex hull area A1 are greater than a predetermined value among a plurality of straight lines L, . . . passing through any two vertices B forming the polygonal convex hull area A1 identified by the contour identifying unit c1 (step S5). Specifically, the straight line identifying unit c2 selects any two vertices B and B from among five vertices B, . . . forming the convex hull area A1, and identifies a straight line L formed by connecting the two vertices B and B, as a candidate straight line L forming the square external contour of the frame image Wa. Then, the straight line identifying unit c2 identifies those candidate straight lines L whose numbers of pixels overlapping a plurality of pixels forming the convex hull area A1 are greater than the predetermined value among the identified candidate straight lines L, as the straight lines L forming the external contour of the frame image Wa.

Then, the straight line identifying unit c2 identifies straight lines L forming the external contour of the frame image Wa, taking into account the angle formed between adjacent straight lines L among a plurality of straight lines L, . . . passing through any two vertices B and B forming the polygonal convex hull area A1 (step S6). Specifically, the straight line identifying unit c2 identifies, for all candidate straight lines L, candidate straight lines L whose angles formed with their adjacent candidate straight lines L are substantially equal to the interior angle (90°) of the square frame of the stamp S. Then, the straight line identifying unit c2 calculates an evaluation value for each candidate straight line L, according to a predetermined arithmetic expression by assigning weights to those pixels overlapping the polygonal convex hull area A1. Then, the straight line identifying unit c2 compares the calculated evaluation values of the candidate straight lines L, and identifies a candidate straight line L with the highest evaluation value as a straight line L forming the external contour of the frame image Wa.

Note that the order of the identification process for straight lines L at step S5 and the identification process for straight lines L at step S6 is an example and thus is not limited thereto. For example, the order may be reversed.

Then, the vertex identifying unit d1 in the frame detecting unit 6d identifies a predetermined number of points where the predetermined number of straight lines L forming the external contour which are identified by the straight line identifying unit c2 intersect each other, as vertices C of the frame portion Sw (frame image Wa) of the imprint Si (step S7). At this time, the vertex identifying unit d1 may identify the vertices C of the frame image Wa, taking into account the coordinate positions of marker images Ma in the captured image Ia (see FIGS. 7A to 7C).

Subsequently, the frame detecting unit 6d determines, based on the results of the identification by the vertex identifying unit d1, whether four vertices C of the frame image Wa have been identified (step S8). Here, if it is determined that four vertices C of the frame image Wa have been identified (step S8; YES), the projective transforming unit d2 performs a projective transformation process on the captured image Ia with reference to the coordinate positions of the four identified vertices C, . . . (step S9). Specifically, the projective transforming unit d2 calculates a coordinate transformation equation that transforms the coordinate positions of four vertices C, . . . of the frame image Wa forming a quadrangle with a distorted outline into the coordinate positions of four vertices C, . . . of a square. Then, the projective transforming unit d2 performs a projective transformation process on the captured image Ia of the imprint Si, according to the calculated coordinate transformation equation, and thereby creates a projective transformed image Ic where the outline of the frame image Wa of the imprint Si is transformed into a square shape.

Note that if, at step S8, it is determined that four vertices C of the frame image Wa have not been identified (step S8; NO), the CPU of the central control unit 1 skips subsequent processes and ends the code reading process.

Then, the frame detecting unit 6d detects the square frame portion Sw (frame image Wa) corresponding to the frame of the stamp S, in the projective transformed image Ic created by the projective transforming unit d2 (step S10). Subsequently, the binarizing unit 6b performs a binarization process where binarization is performed using a predetermined threshold value, on image data of the projective transformed image Ic created by the projective transforming unit d2, and thereby generates image data of a second binarized image Id (step S11).

Then, the information reading unit 6e performs a reading process for reading predetermined information from the code information Sc in the frame portion Sw (frame image Wa) of the second binarized image Id corresponding to the projective transformed image Ic created by the projective transforming unit d2 (step S12). Specifically, the information reading unit 6e identifies, in the second binarized image Id, a square read area D and performs scanning in a predetermined direction from a predetermined position (e.g., an upper left corner portion) of the read area D to identify coordinate positions where a set of white pixels with the pixel value "1" and a set of black pixels with the pixel value "0" are present. Then, the information reading unit 6e performs a decoding process on an arrangement of the identified set of white pixels and set of black pixels, and thereby reads original predetermined information (e.g., a URL) represented by the code information Sc.

Subsequently, the information reading unit 6e determines whether the original predetermined information has been read a plurality of times from the code information Sc by the reading process (step S13).

Here, if it is determined that the original predetermined information has been read a plurality of times (step S13; YES), the information reading unit 6e determines that the predetermined information has been able to be read properly, and thus the operation processing unit 7 performs predetermined operation (e.g., accessing the Internet to play back specific audio and images), according to the predetermined information (e.g., a URL) read by the information reading unit 6e (step S14).

On the other hand, if it is determined at step S13 that the original predetermined information has not been read a plurality of times (step S13; NO), the CPU of the central control unit 1 skips the process at step S14 and ends the code reading process.

As described above, according to the portable terminal 100 of the present embodiment, in a captured image Ia where is captured an imprint Si having code information Sc added to a polygonal (e.g., square) frame portion Sw around a predetermined mark image Sp, a predetermined number of straight lines L that form an external contour of the frame portion Sw (frame image Wa) corresponding to a polygonal frame and that are provided according to the number of corners of the polygonal frame are estimated to detect the frame image Wa of the captured image Ia which is formed of the estimated predetermined number of straight lines L. Thus, by using the predetermined number of straight lines L forming the external contour of the frame image Wa, the frame image Wa of the captured image Ia can be detected properly. Namely, for example, even if the imprint Si is blurred or faint and thus the vertices C of the frame image Wa cannot be detected properly, by estimating a predetermined number of straight lines L forming the external contour of the frame image Wa, the frame portion Sw (frame image Wa) can be detected properly from the captured image Ia, using the straight lines L.

In addition, a polygonal area (convex hull area A1) corresponding to the external contour of the frame portion Sw (frame image Wa) of the captured image Ia is identified, and a predetermined number of straight lines L forming the external contour of the frame image Wa are identified based on the positions of a plurality of vertices B, forming the identified polygonal area. Thus, the frame image Wa can be detected properly from the captured image Ia, using the identified predetermined number of straight lines L. Specifically, a predetermined number of straight lines L forming the external contour of the frame image Wa can be identified based on at least either one of the number of pixels of each straight line L overlapping the polygonal area among a plurality of straight lines L, . . . passing through any two vertices B and B forming the polygonal area, and a relative relationship between adjacent straight lines L.

Namely, of a plurality of straight lines L, . . . passing through any two vertices B and B forming the polygonal area, straight lines L whose numbers of pixels overlapping a plurality of pixels forming the polygonal area are greater than a predetermined value are identified, and the straight lines L are identified as straight lines L forming the external contour of the frame image Wa. Thus, the straight lines L forming the external contour of the frame image Wa can be identified properly, taking into account the degree of overlap between candidate straight lines L for the straight lines L forming the external contour of the frame image Wa and a plurality of pixels forming the polygonal area.

In addition, of a plurality of straight lines L, . . . passing through any two vertices B and B forming the polygonal area, straight lines L whose angles formed with their adjacent straight lines L are substantially equal to the interior angle of the polygonal frame are identified. Then, an evaluation value for each straight line L is calculated by assigning weights to those pixels among the pixels forming the straight line L that overlap the polygonal area, and a straight line L whose calculated evaluation value is high is identified as a straight line L forming the external contour of the frame image Wa. Thus, the straight lines L forming the external contour of the frame image Wa can be identified properly, taking into account the relative relationship between candidate straight lines L for the straight lines L forming the external contour of the frame image Wa.

In addition, a predetermined number of points where the predetermined number of straight lines L forming the external contour of the frame portion Sw (frame image Wa) intersect each other are identified as the vertices C of the frame image Wa. Based on the identified predetermined number of vertices C, the frame image Wa of the captured image Ia is detected. Thus, the frame image Wa of the captured image Ia can be detected properly using the predetermined number of points (vertices C) where the predetermined number of straight lines L forming the external contour of the frame image Wa intersect each other. At this time, by identifying the vertices C of the frame image Wa based on the coordinate positions of marker images Ma corresponding to markers Sm of a predetermined shape which are present at the corners of the polygonal frame in the captured image Ia, even if, for example, the captured image Ia is one where a blurred imprint Si is captured, the vertices C of the frame image Wa can be identified properly, enabling to properly detect the frame image Wa of the captured image Ia.

Furthermore, a projective transformation process is performed on the captured image Ia based on the identified predetermined number of vertices C, thereby generating a polygonal captured image (projective transformed image Ic). Then, the frame image Wa corresponding to a frame of the created polygonal captured image Ia is detected. Thus, even if the captured image Ia is one where a blurred or faint imprint Si is captured, a projective transformation process can be performed properly using a predetermined number of points (vertices C) where a predetermined number of straight lines L forming the external contour of the frame image Wa intersect each other. As a result, the polygonal frame image Wa can be detected properly.

In addition, predetermined information can be read properly from code information Sc in the frame portion Sw (frame image Wa) of the captured image Ia. At this time, when a predetermined number or more of pieces of the identical code information have been read from the captured image Ia of the imprint Si having a plurality of pieces of identical code information Sc added to the frame portion Sw, performance of processes for the predetermined information is controlled. Thus, by embedding multiple pieces of code information Sc, . . . in the frame portion Sw, original predetermined information can be stably read from the code information Sc, enabling to properly perform processes for the read predetermined information.

Note that the present invention is not limited to the above-described embodiment, and various modifications and design changes may be made thereto without departing from the spirit and scope of the present invention.

A second embodiment of the portable terminal 200 will be described below.

Second Embodiment

Figure 8:
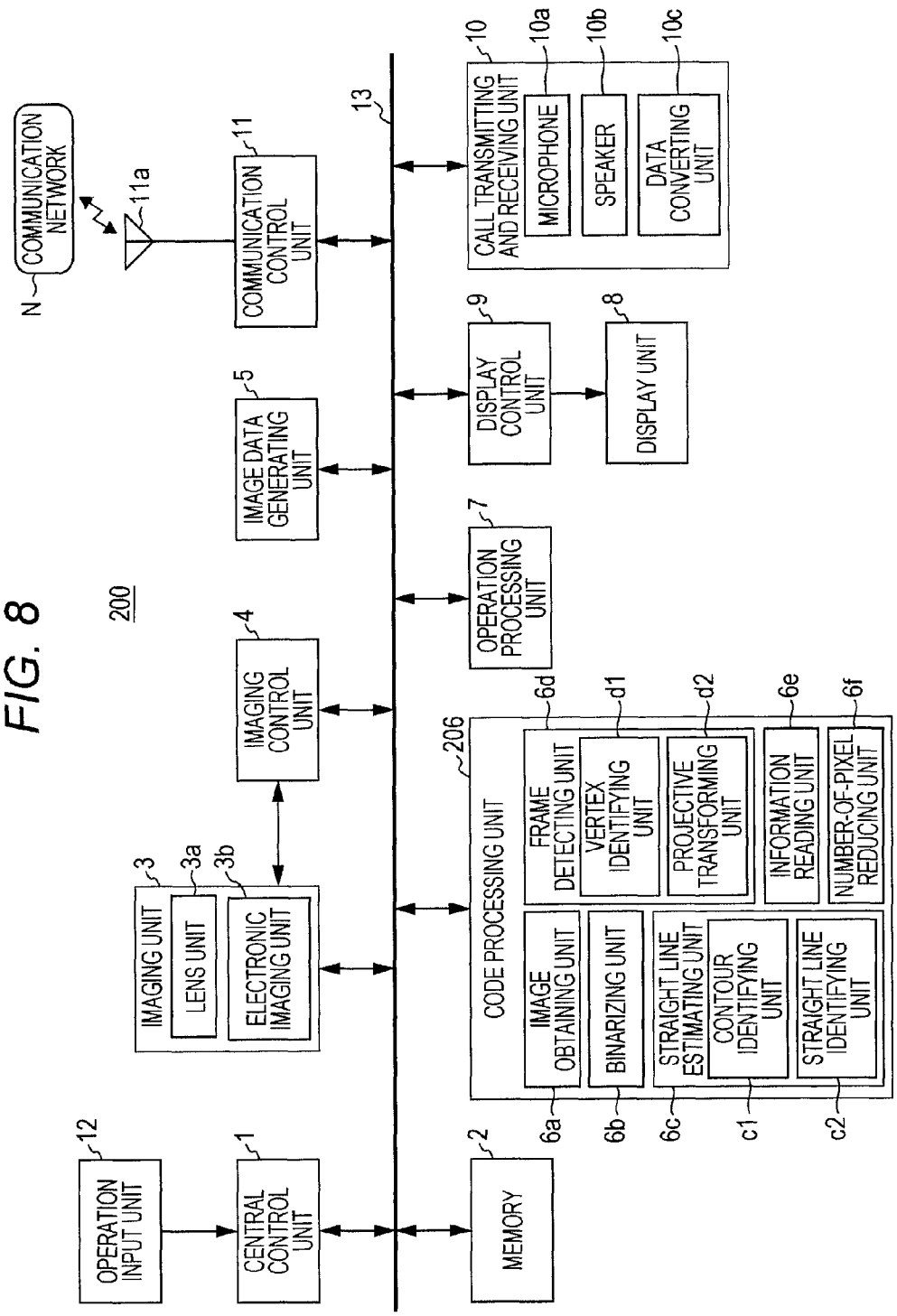
FIG. 8 is a block diagram illustrating a schematic configuration of a portable terminal of a second embodiment to which the present invention is applied.

FIG. 8 is a block diagram illustrating a schematic configuration of a portable terminal 200 of a second embodiment.

As illustrated in FIG. 8, a code processing unit 206 of the portable terminal 200 of the second embodiment includes a number-of-pixel reducing unit 6f, in addition to an image obtaining unit 6a, a binarizing unit 6b, a straight line estimating unit 6c, a frame detecting unit 6d, and an information reading unit 6e.

Note that the configuration of the portable terminal 200 of the second embodiment is substantially the same as that of a portable terminal 100 of the above-described embodiment, except for the points described in detail below, and thus, a detailed description thereof is omitted.

The number-of-pixel reducing unit 6f performs a number-of-pixel reduction process for reducing the number of pixels present on the background of a captured image Ia.

Figure 10A:
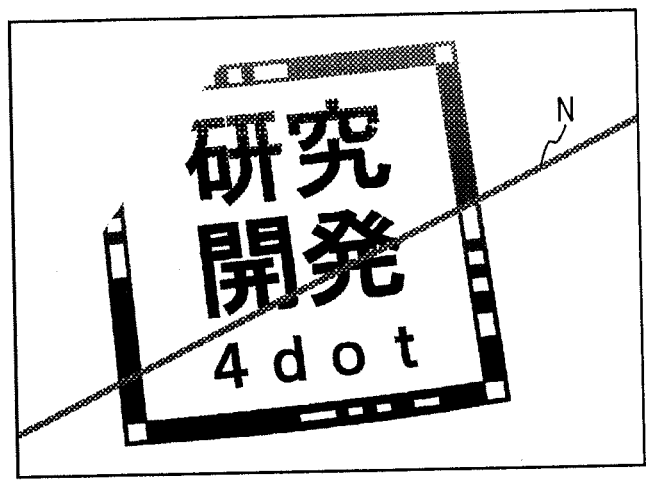
FIGS. 10A to 10C are diagrams schematically illustrating examples of images related to the code reading process of FIG. 9.

Namely, the number-of-pixel reducing unit 6f performs the process of relatively reducing the number of pixels present on the background, on a first binarized image Ib corresponding to a captured image Ia obtained by the image obtaining unit 6a. Specifically, when an imprint Si is affixed on, for example, a ruled line N of a notebook (see FIG. 10A), but not on a recording medium of a uniform color or pattern, the straight line estimating unit 6c may not be able to properly estimate straight lines L forming an external contour of a frame portion Sw (frame image Wa).

Figure 10B:
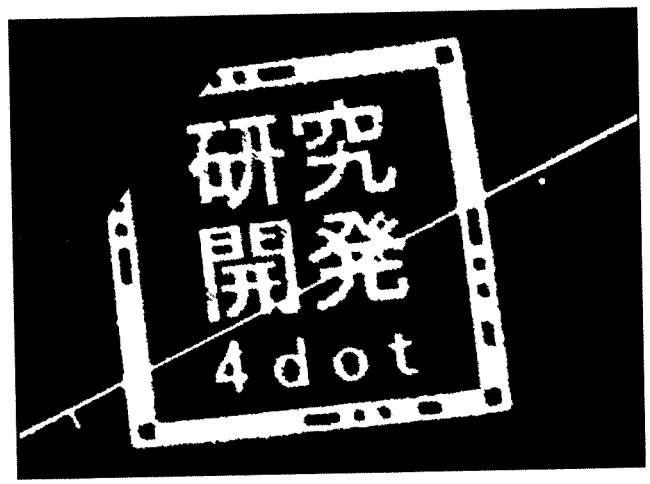
Figure 10C:
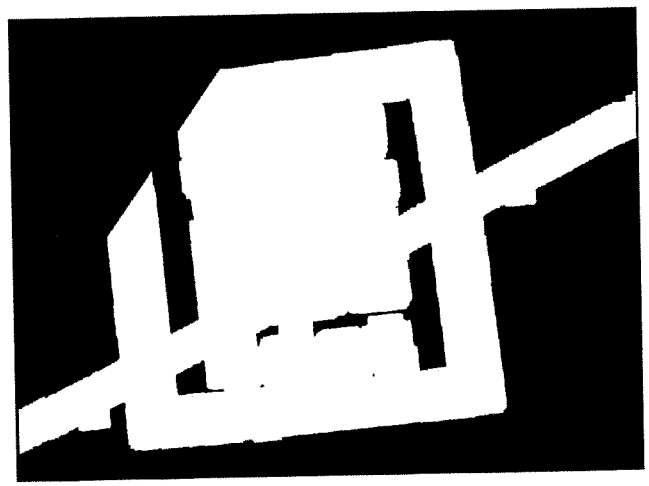
Figure 11A:
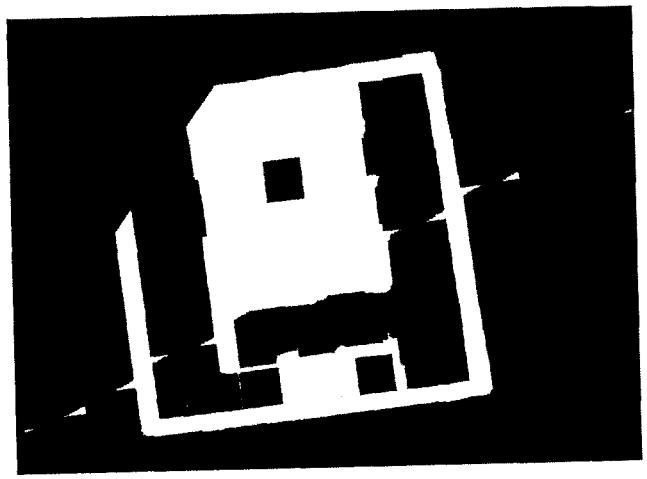
FIGS. 11A to 11C are diagrams schematically illustrating examples of images related to the code reading process of FIG. 9.
Figure 11B:
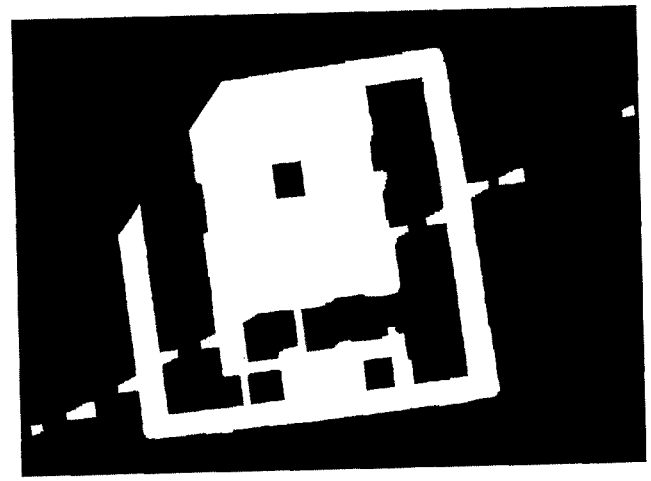

Hence, the number-of-pixel reducing unit 6f obtains image data of the first binarized image Ib generated by the binarizing unit 6b, and performs the process of inverting white pixels and black pixels (see FIG. 10B). Then, the number-of-pixel reducing unit 6f performs a dilation process and an erosion process for removing a set of pixels smaller than a predetermined value which are present on the background of the first binarized image Ib (see FIG. 10C, etc.). For example, the number-of-pixel reducing unit 6f performs a dilation process for adding such a number of pixels that makes the target pixel one size larger, on each pixel which is a processing target in a black and white inverted image Ie (see FIG. 10B) of the first binarized image Ib (see FIG. 10C). Then, the number-of-pixel reducing unit 6f performs an erosion process for stripping away such a number of pixels that makes the target pixel two sizes smaller (see FIG. 11A). Then, the number-of-pixel reducing unit 6f performs a dilation process for adding such a number of pixels that makes the target pixel one size larger (see FIG. 11B). By this, the number of pixels present on the background of the first binarized image Ib is relatively reduced with respect to the number of pixels forming the frame image Wa. Accordingly, the influence of the pixels present on the background of the imprint Si is reduced when the straight line estimating unit 6c estimates straight lines L forming the external contour of the frame image Wa.

Figure 11C:
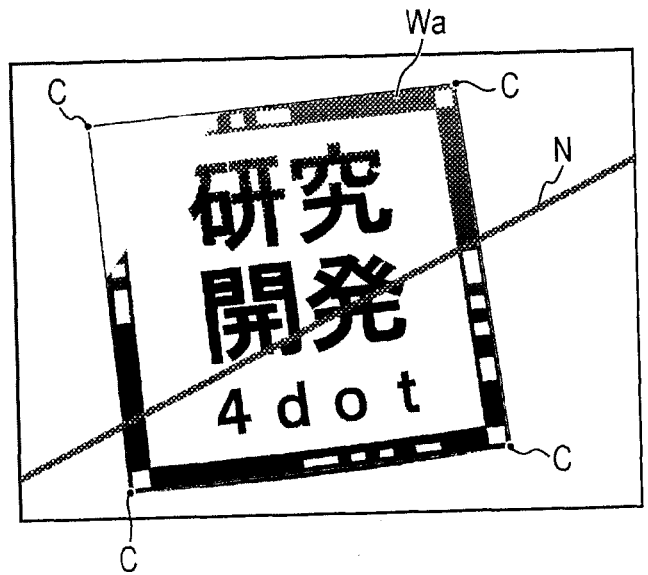

Then, the straight line estimating unit 6c estimates four straight lines L, . . . forming the external contour of the frame portion Sw (frame image Wa) corresponding to a square frame of a stamp S, in the first binarized image Ib processed by the number-of-pixel reducing unit 6f. Then, the frame detecting unit 6d detects the frame image Wa of the captured image Ia (see FIG. 11C).

<Code Reading Process>

Next, a code reading process by the portable terminal 200 of the second embodiment will be described with reference to FIG. 9.

Figure 9:
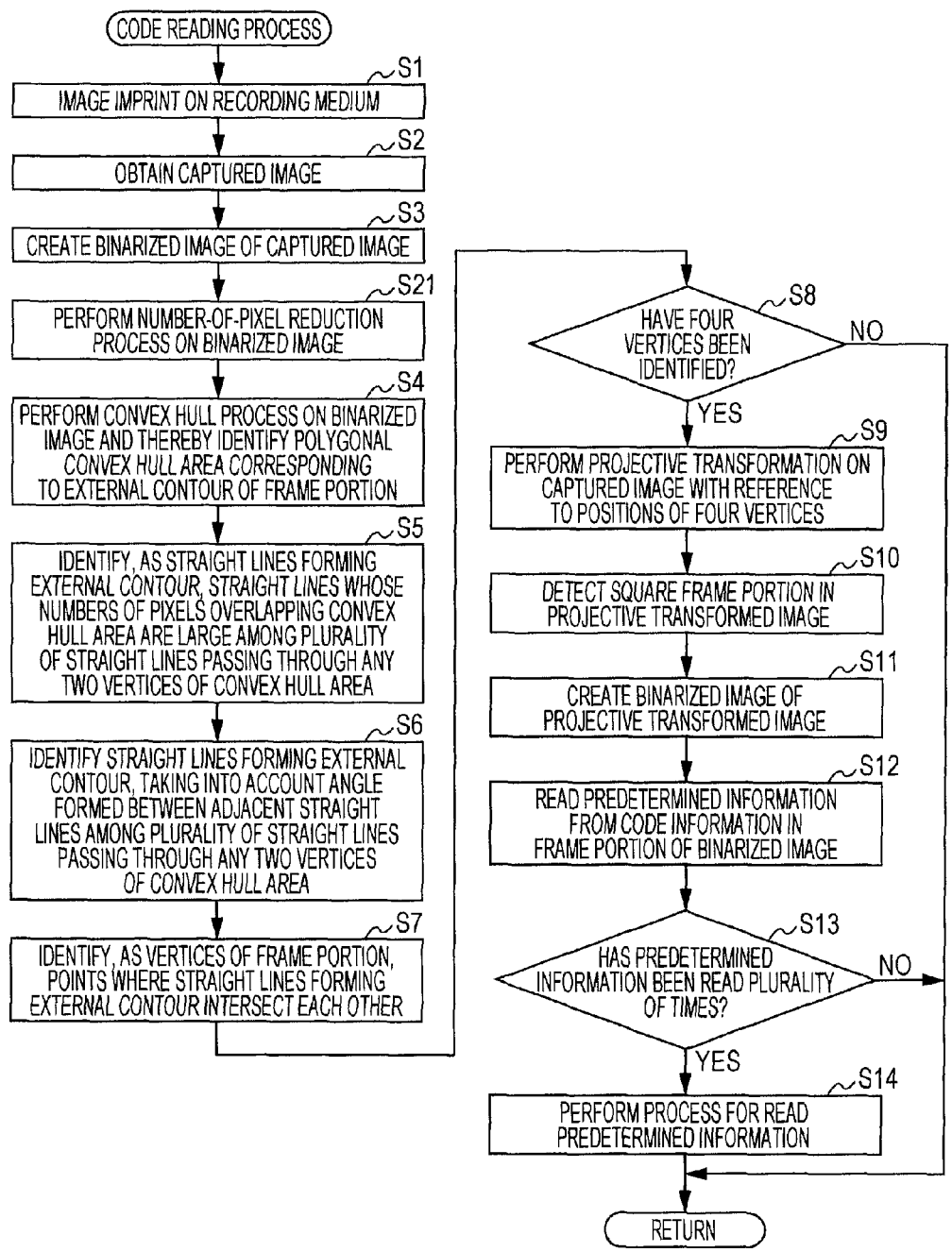
FIG. 9 is a flowchart illustrating an example of operation related to a code reading process by the portable terminal of FIG. 8.

FIG. 9 is a flowchart illustrating an example of operation related to a code reading process.

Note that the code reading process by the portable terminal 200 of the second embodiment is substantially the same as a code reading process by the portable terminal 100 of the above-described embodiment, except for the points described in detail below, and thus, a detailed description thereof is omitted.

As illustrated in FIG. 9, the code processing unit 206 performs the processes at steps S1 to S3 in the same manner as the code reading process by the portable terminal 100 of the above-described embodiment, and thereby generates image data of a first binarized image Ib (see FIG. 4B).

The number-of-pixel reducing unit 6f performs a number-of-pixel reduction process on the generated image data of the first binarized image Ib (step S21). Specifically, the number-of-pixel reducing unit 6f performs the process of inverting white pixels and black pixels, on the image data of the first binarized image Ib. Then, the number-of-pixel reducing unit 6f performs a dilation process and an erosion process to relatively reduce the number of pixels present on the background of the first binarized image Ib with respect to the number of pixels forming a frame portion Sw (frame image Wa).

Subsequently, a contour identifying unit c1 performs a convex hull process on the image data of the first binarized image Ib having been subjected to the number-of-pixel reduction process, and thereby identifies a polygonal convex hull area A1 corresponding to an external contour of the frame portion Sw (see FIG. 4C) (step S4).

Then, the code processing unit 206 performs the processes after step S4 in the same manner as the code reading process by the portable terminal 100 of the above-described embodiment, and thereby performs detection of straight lines L forming the external contour of the frame portion Sw (frame image Wa) (steps S5 and S6), detection of the frame portion Sw (frame image Wa) (step S10), reading of predetermined information from code information (step S12), etc.

Therefore, according to the portable terminal 200 of the second embodiment, the process of relatively reducing the number of pixels present on the background of a captured image Ia is performed, and a predetermined number of straight lines L forming an external contour of a frame portion Sw (frame image Wa) are estimated in the processed captured image Ia. Thus, even when an imprint Si is affixed on, for example, a notebook with ruled lines N which is not a recording medium of a uniform color or pattern, by relatively reducing the number of pixels present on the background of the captured image Ia, the influence of the pixels present on the background of the captured image Ia is reduced, enabling to properly estimate straight lines L forming the external contour of the frame image Wa.

In addition, although in the above-described embodiments a straight line identifying unit c2 identifies a predetermined number of straight lines L forming the external contour of the frame image Wa with reference to both of the number of pixels of each straight line L overlapping a polygonal convex hull area A1 among a plurality of straight lines L, . . . passing through any two vertices B and B forming the polygonal convex hull area A1, and a relative relationship between adjacent straight lines L, such identification may be performed with reference to only one of them.

Furthermore, although in the above-described embodiments the shape of the frame portion Sw is square, it is an example and thus the shape is not limited thereto. For example, the shape may be polygonal other than square.

In addition, although in the above-described embodiments pieces of identical code information Sc are added to the sides Sa of the frame portion Sw of the imprint Si, respectively, it is an example and thus the configuration is not limited thereto. For example, different pieces of code information Sc may be added. In this case, the amount of code information (original predetermined information) Sc embedded in the frame portion Sw can be increased.

Furthermore, although in the above-described embodiments the portable terminals 100 and 200 are exemplified as an image processing apparatus, it is an example and thus the apparatus is not limited thereto. The apparatus can be arbitrarily changed where appropriate, as long as the apparatus can control performance of the process of detecting a frame portion Sw (frame image Wa).

In addition, although in the above-described embodiments the configuration is such that the functions of an obtaining unit, an estimating unit, and a detecting unit are implemented by the image obtaining unit 6a, the straight line estimating unit 6c, and the frame detecting unit 6d driving under the control of the central control unit 1 of the portable terminal 100 (200), the configuration is not limited thereto. The configuration may be such that the functions are implemented by the CPU of the central control unit 1 executing a predetermined program, etc.

Namely, a program including an obtaining process routine, an estimation process routine, and a detection process routine is stored in a program memory that stores programs. Then, by the obtaining process routine, the CPU of the central control unit 1 may be allowed to function as a unit that obtains a captured image Ia where an imprint Si of a stamp S is captured. In the stamp S, a polygonal frame around a predetermined mark is formed such that code information Sc where predetermined information is encoded into a regular arrangement of a set of pixels is added to the imprint Si. In addition, by the estimation process routine, the CPU of the central control unit 1 may be allowed to function as a unit that estimates, in the obtained captured image Ia, a predetermined number of straight lines L that form an external contour of a frame portion Sw corresponding to a polygonal frame and that are provided according to the number of corners of the polygonal frame. In addition, by the detection process routine, the CPU of the central control unit 1 may be allowed to function as a unit that detects the frame portion Sw of the captured image Ia which is formed of the estimated predetermined number of straight lines L.

Likewise, the configuration may be such that a contour identifying unit, a straight line identifying unit, a vertex identifying unit, a creating unit, a reading unit, a processing unit, and a number-of-pixel reducing unit are also implemented by the CPU of the central control unit 1 executing a predetermined program, etc.

Furthermore, as a computer-readable medium storing a program for performing the above-described processes, in addition to ROM, a hard disk, etc., portable recording media such as nonvolatile memory, e.g., flash memory, and a CD-ROM can also be applied. In addition, as a medium that provides program data through a predetermined communication line, a carrier wave is also applied.

Next, for a third embodiment of the present invention, a specific mode will be described using the drawings. Note, however, that the scope of the invention is not limited to the examples illustrated.

Third Embodiment

Figure 12:
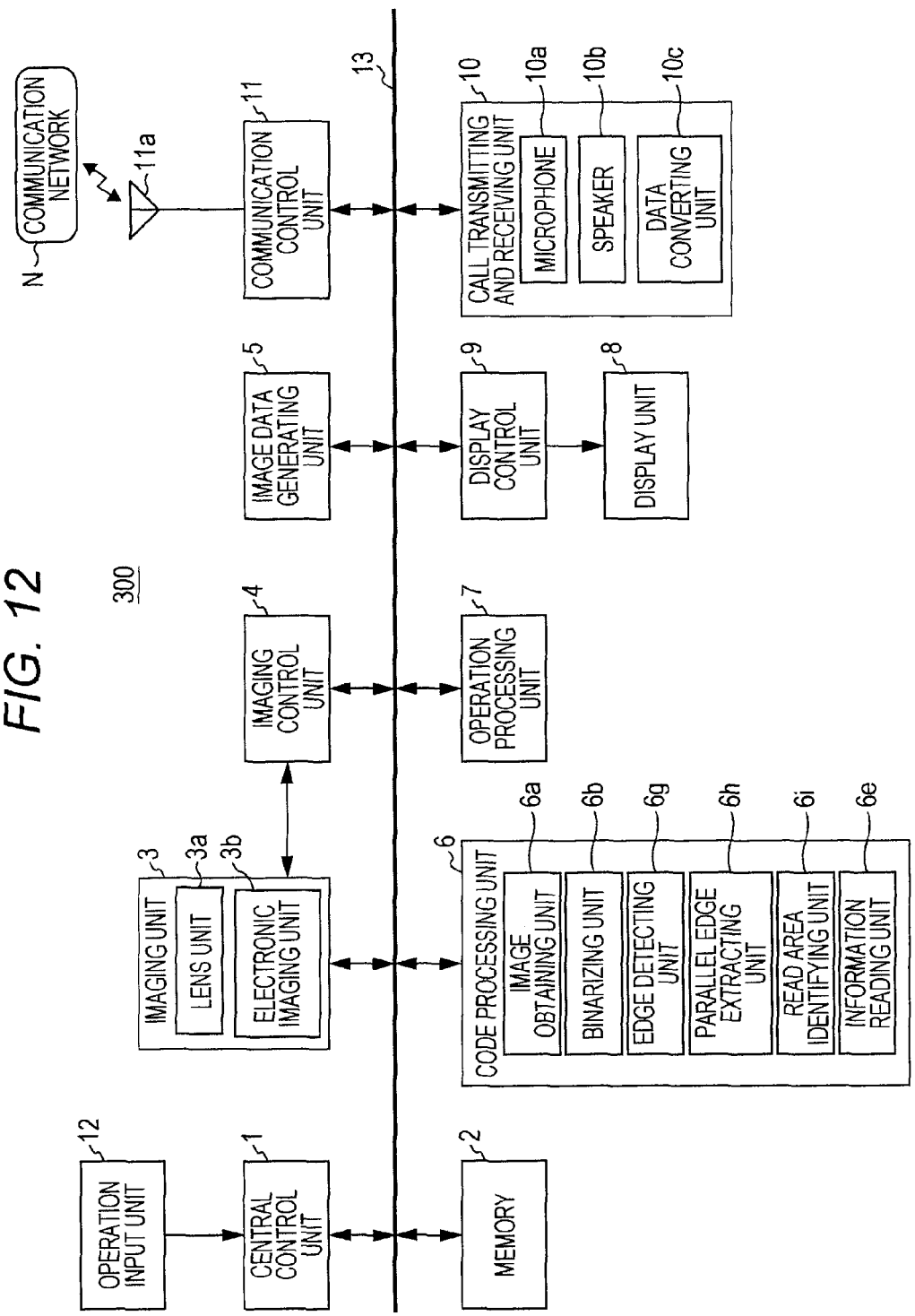
FIG. 12 is a block diagram illustrating a schematic configuration of a portable terminal of a third embodiment to which the present invention is applied.

FIG. 12 is a block diagram illustrating a schematic configuration of a portable terminal 300 of the third embodiment to which the present invention is applied.

As illustrated in FIG. 12, a code processing unit 6 of the portable terminal 300 of the third embodiment includes an edge detecting unit 6g, a parallel edge extracting unit 6h, and a read area identifying unit 6i, in addition to an image obtaining unit 6a, a binarizing unit 6b, and an information reading unit 6e.

Note that the configuration of the portable terminal 300 of the third embodiment is substantially the same as that of a portable terminal 100 of the above-described embodiment, except for the points described in detail below, and thus, a detailed description thereof is omitted.

The edge detecting unit 6g detects edges E of an imprint image.

Namely, the edge detecting unit 6g detects a plurality of edges E from a binarized image Ib corresponding to a captured image Ia obtained by the image obtaining unit 6a. Specifically, for example, the edge detecting unit 6g performs a differential operation on image data of a binarized image Ib generated by the binarizing unit 6b, using a predetermined differential filter (e.g., a Laplacian filter), and thereby detects, as edges E, portions where there is an abrupt change in luminance value, color, or density. Then, the edge detecting unit 6g generates image data of an edge image Ic (see FIG. 15C) from the detected edges E.

Note that the above-described procedure of an edge detection process is an example and thus is not limited thereto and can be arbitrarily changed where appropriate.

The parallel edge extracting unit 6h extracts two parallel edges E and E.

Namely, the parallel edge extracting unit 6h extracts two substantially parallel edges E and E, the space between which is substantially equal to the width of a frame portion Sw, from among the plurality of edges E, . . . detected by the edge detecting unit 6g. Specifically, the parallel edge extracting unit 6h sequentially applies a parallel edge filter F to the image data of the edge image Ic in a predetermined direction (e.g., downward) from a predetermined position (e.g., an upper left corner portion), and thereby extracts two substantially parallel edges E and E, the space between which is substantially equal to the width of the frame portion Sw (see FIGS. 16A and 16B).

The parallel edge filter F is added with two edge detection areas Fa and Fa having a predetermined length (e.g., 20 pixels) and a predetermined width (e.g., 5 pixels), with a predetermined space between the areas Fa and Fa. By adjusting the space between the two edge detection areas Fa and Fa to be substantially equal to the width of the frame portion Sw, the parallel edge extracting unit 6h extracts two substantially parallel edges E and E, the space between which is substantially equal to the width of the frame portion Sw, from the edge image Ic. At this time, the parallel edge extracting unit 6h extracts two parallel edges E and E corresponding to the frame portion Sw, by using two edge detection areas Fa and Fa which are rotated around a center Fc by a predetermined angle (e.g., 90°).

Figure 16A:
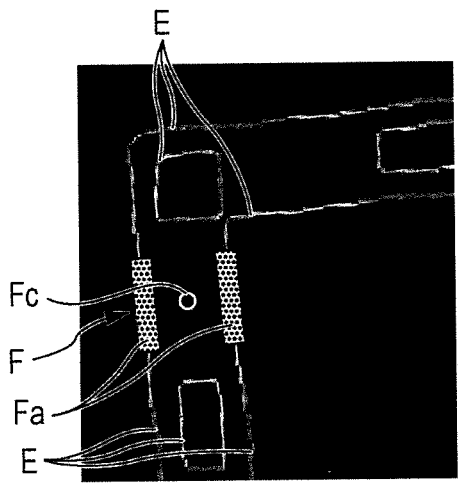
FIGS. 16A to 16C are diagrams schematically illustrating examples of images related to the code reading process of FIG. 13.
Figure 16B:
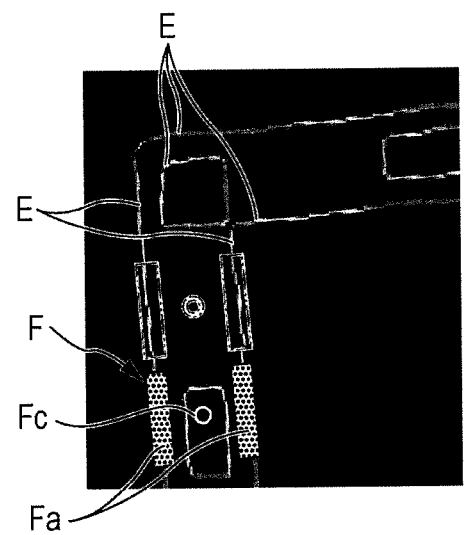

Note that FIGS. 16A and 16B illustrate only a part of the upper left corner portion of the edge image Ic in an enlarged manner.

In addition, the above-described procedure of the process using the parallel edge filter F is an example and thus is not limited thereto and can be arbitrarily changed where appropriate. For example, multiple parallel edge filters F having different widths between two edge detection areas Fa and Fa and different angles of rotation may be prepared, and two parallel edges E and E corresponding to a frame portion Sw may be extracted using each of the parallel edge filters F.

The read area identifying unit 6i identifies a read area A for code information Sc.

Namely, the read area identifying unit 6i identifies a read area A for code information Sc in the captured image Ia, based on the two substantially parallel edges E and E extracted by the parallel edge extracting unit 6h. Specifically, the read area identifying unit 6i identifies, as a read area A, an area corresponding to a line formed by connecting the midpoints of the two substantially parallel edges E and E (an area corresponding to an inner area between the two edges E and E), in the binarized image Ib corresponding to the captured image Ia.

Figure 16C:
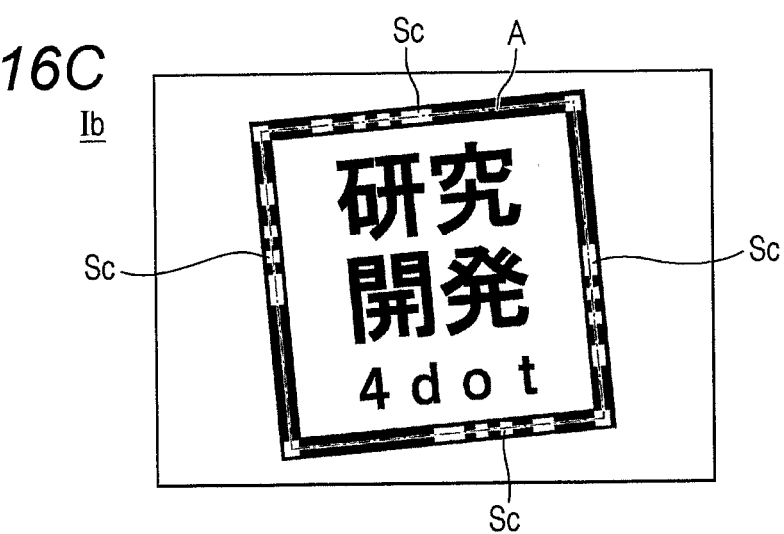

For example, the read area identifying unit 6i identifies a line of a predetermined shape (e.g., a square shape) by connecting the midpoints of the two substantially parallel edges E and E which are extracted by the parallel edge extracting unit 6h, and adapts the identified line to the binarized image Ib, and thereby identifies a read area A for code information Sc in the binarized image Ib (see FIG. 16C).

The information reading unit 6e performs a reading process for reading original predetermined information from code information Sc.

Namely, the information reading unit 6e reads predetermined information from code information Sc in the read area A identified by the read area identifying unit 6i. Specifically, the information reading unit 6e reads predetermined information in the binarized image Ib corresponding to the captured image Ia, based on the pixel values of pixels (code information Sc) present in the read area A. For example, the information reading unit 6e performs scanning in a predetermined direction from a predetermined position (e.g., an upper left corner portion) of the read area A to identify coordinate positions where a set of white pixels with the pixel value "1" and a set of black pixels with the pixel value "0" are present. The information reading unit 6e performs a decoding process appropriate to an encoding scheme used for the code information Sc, on an arrangement of the identified set of white pixels and set of black pixels, and thereby reads original predetermined information (e.g., a URL) represented by the code information Sc.

At this time, the information reading unit 6e performs a reading process on an area-by-area basis, each area corresponding to a side Sa of the frame portion Sw in the read area A. That is, reading of original predetermined information from the code information Sc is performed a number of times (e.g., four times) according to the number of sides Sa of the frame portion Sw. Here, since pieces of identical code information Sc are added to the sides Sa of the frame portion Sw, respectively, the information reading unit 6e may be configured such that, for example, when a plurality of pieces of original predetermined information are read as a result of being detected at two or more locations, the information reading unit 6e determines that the predetermined information has been able to be read properly.

Note that the above-described reading process is a publicly known technique and thus a detailed description thereof is omitted here.

An operation processing unit 7 performs predetermined operation, according to the original predetermined information of the code information Sc read by the information reading unit 6e.

Namely, when the information reading unit 6e has read a predetermined number or more of pieces of the identical code information, the operation processing unit 7 controls performance of processes for the predetermined information. Specifically, for example, when a URL is read as predetermined information, the operation processing unit 7 controls a communication control unit 11 to access a specific page on the Internet which is specified by the obtained URL. Then, the operation processing unit 7 controls a display control unit 9, a call transmitting and receiving unit 10, etc., to perform various types of processes, according to the instructions to perforin various types of processes which are set in advance (e.g., playback of specific audio and images).

A display unit 8 is configured with, for example, a liquid crystal display panel, and displays an image (e.g., a live view image) captured by an imaging unit 3 on a display screen, based on a video signal from the display control unit 9.

The display control unit 9 performs control to read display image data which is temporarily stored in a memory 2, and allow the display unit 8 to perform display.

Specifically, the display control unit 9 includes VRAM (Video Random Access Memory), a VRAM controller, a digital video encoder, etc. The digital video encoder reads a luminance signal Y and color-difference signals Cb and Cr which are read from the memory 2 and stored in the VRAM (not illustrated) under the control of a central control unit 1, at a predetermined playback frame rate (e.g., 30 fps) from the VRAM through the VRAM controller, generates a video signal based on these data, and outputs the video signal to the display unit 8.

For example, the display control unit 9 allows the display unit 8 to perform live view display while sequentially updating, at a predetermined display frame rate, a plurality of frame images, . . . which are captured by the imaging unit 3 and an imaging control unit 4 and are created by an image data generating unit 5.

The call transmitting and receiving unit 10 performs a call with an external user of an external device connected thereto through a communication network N.

Specifically, the call transmitting and receiving unit 10 includes a microphone 10a, a speaker 10b, a data converting unit 10c, etc. The call transmitting and receiving unit 10 allows the data converting unit 10c to perform an A/D conversion process on user's transmitting audio which is inputted from the microphone 10a, and output transmitting audio data to the central control unit 1, and allows the data converting unit 10c to perform a D/A conversion process on audio data such as receiving audio data which is outputted from the communication control unit 11 and inputted thereto under the control of the central control unit 1, and output the audio data from the speaker 10b.

The communication control unit 11 performs transmission and reception of data through the communication network N and a communication antenna 11a.

Namely, the communication antenna 11a is an antenna capable of performing transmission and reception of data compliant with a predetermined communication scheme (e.g., a W-CDMA (Wideband Code Division Multiple Access) scheme or a GSM (Global System for Mobile Communications; registered trademark) scheme) which is adopted by the portable terminal 300 for communication with a wireless base station (not illustrated). The communication control unit 11 performs transmission and reception of data with the wireless base station through the communication antenna 11a, according to a communication protocol for the predetermined communication scheme, using a communication channel set by the communication scheme. That is, the communication control unit 11 transmits and receives to/from an external device, which is a communication counterpart, audio generated during a call with an external user of the external device or transmits and receives data of email to/from the external device, based on instruction signals outputted from the central control unit 1 and inputted thereto.

Note that the configuration of the communication control unit 11 is an example and thus is not limited thereto and can be arbitrarily changed where appropriate. For example, though not illustrated, the configuration may be such that a wireless LAN module is mounted on the communication control unit 11 so that the communication control unit 11 can access the communication network N through an access point.

The communication network N is, for example, a communication network that connects the portable terminal 300 to an external device through a wireless base station, a gateway server (not illustrated), etc.

In addition, the communication network N is, for example, a communication network constructed using a dedicated line or an existing general public line, and various line modes such as a LAN (Local Area Network) and a WAN (Wide Area Network) can be applied. The communication network N includes, for example, various types of communication networks such as a telephone network, an ISDN network, a dedicated line, a mobile communication network, a communication satellite line, and a CATV network, an IP network, a VoIP (Voice over Internet Protocol) gateway, and an Internet service provider.

An operation input unit 12 is to input various types of instructions to a terminal main body.

Specifically, the operation input unit 12 includes various types of buttons (none of which are illustrated) such as a shutter button related to an instruction to shoot a subject, up/down/left/right cursor buttons and an Enter button related to an instruction to select a mode, a function, etc., communication-related buttons related to an instruction to perform sending and receiving of telephone calls, transmission and reception of email, etc., and numeric buttons and symbol buttons related to an instruction to input text.

When various types of buttons are operated by a user, the operation input unit 12 outputs an operation instruction according to the operated button to the central control unit 1. The central control unit 1 allows each unit to perform predetermined operation (e.g., capturing of a subject, sending or receiving of a telephone call, or transmission or reception of email), according to the operation instruction outputted from the operation input unit 12 and inputted thereto.

Note that the operation input unit 12 may have a touch panel integrally formed with the display unit 8, and may output, based on a user's predetermined operation on the touch panel, an operation instruction according to the predetermined operation to the central control unit 1.

<Code Reading Process>

Next, a code reading process by the portable terminal 300 will be described with reference to FIGS. 13 to 16A to 16C.

Figure 13:
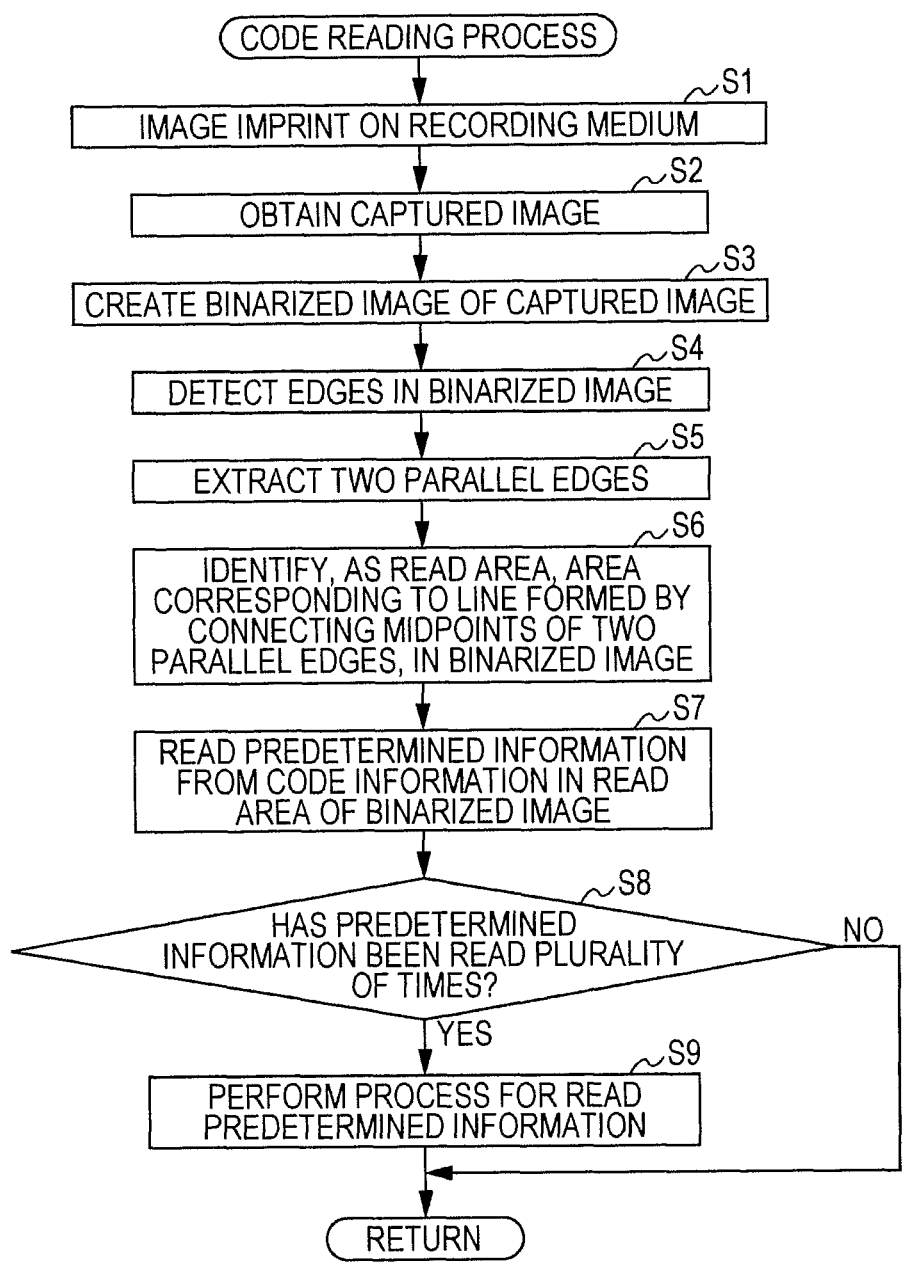
FIG. 13 is a flowchart illustrating an example of operation related to a code reading process by the portable terminal of FIG. 12.

FIG. 13 is a flowchart illustrating an example of operation related to a code reading process.

Figure 14A:
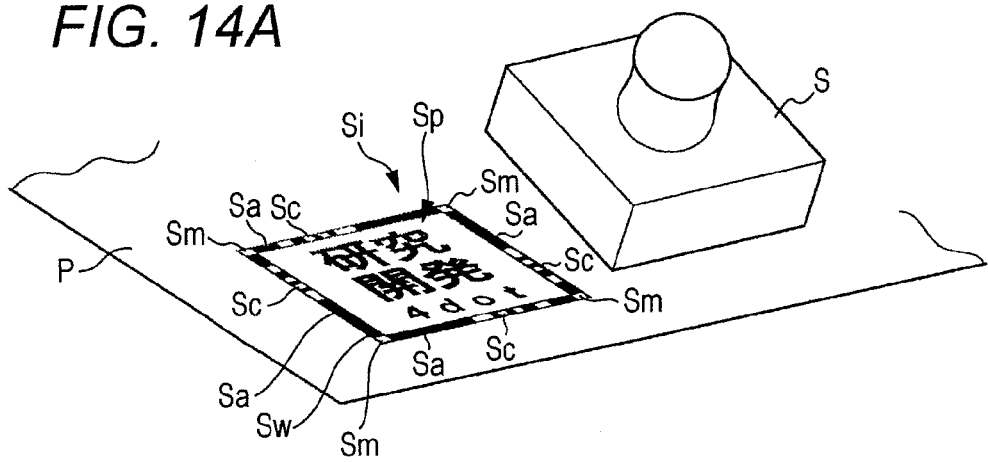
FIGS. 14A and 14B are diagrams for describing the code reading process of FIG. 13.

Note that it is assumed that an imprint Si captured in the following code reading process is affixed, for example, in a predetermined position on a recording medium P such as a postcard (see FIG. 14A). Note also that it is assumed that pieces of identical code information Sc are added to sides Sa of a frame portion Sw of the imprint Si, respectively.

Figure 14B:
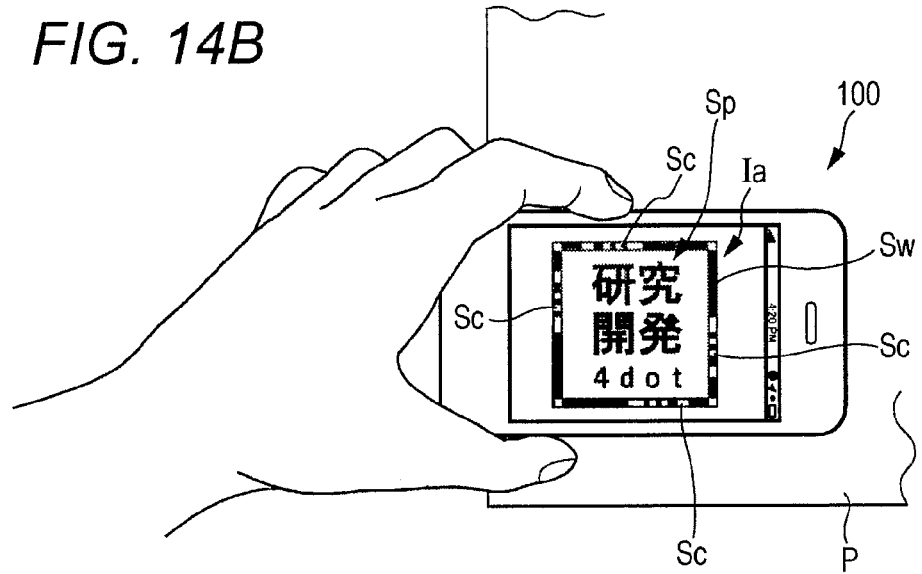

As illustrated in FIG. 13, first, when an imaging instruction is inputted based on a user's predetermined operation on the operation input unit 12, the imaging control unit 4 allows the imaging unit 3 to capture an imprint Si, and the image data generating unit 5 generates image data of a captured image Ia transferred from an electronic imaging unit 3b (step S1; see FIG. 14B).

Then, the image data generating unit 5 outputs the generated YUV data of the captured image Ia to the memory 2, and allows the memory 2 to store the YUV data.

Note that in order to facilitate capturing of the imprint Si closer to a square shape, the display control unit 9 may allow the display unit 8 to display a guide corresponding to the outline of the imprint Si.

Figure 15A:
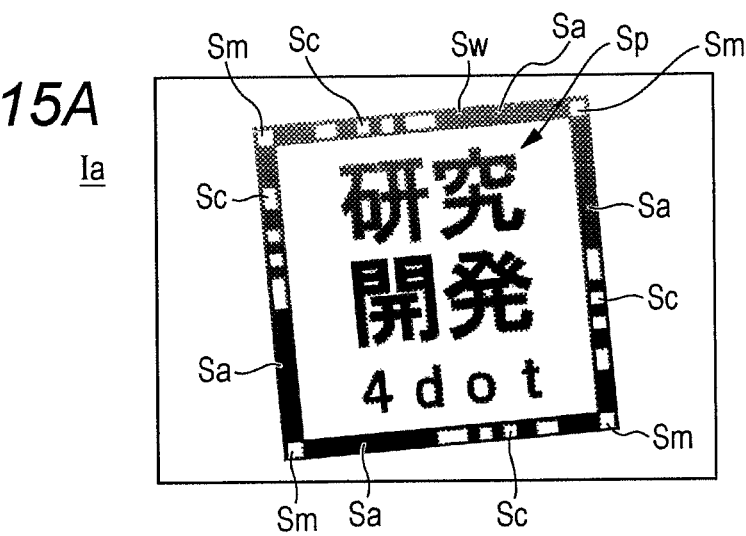
FIGS. 15A to 15C are diagrams schematically illustrating examples of images related to the code reading process of FIG. 13.
Figure 15B:
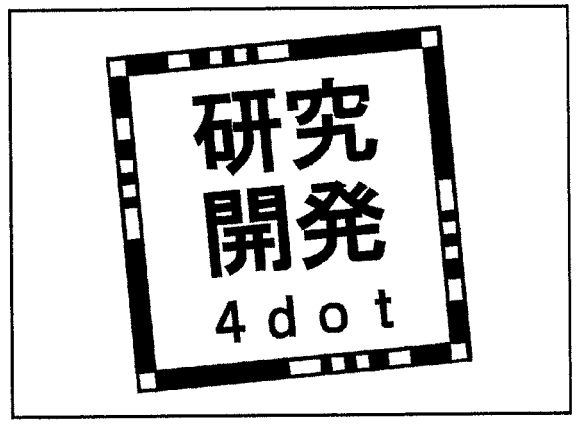
Figure 15C:
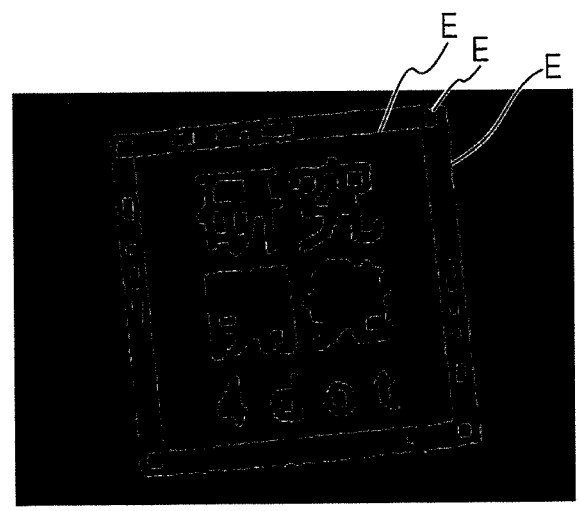

Then, the image obtaining unit 6a in the code processing unit 6 obtains from the memory 2 the image data (e.g., luminance data) with a predetermined resolution of the captured image Ia generated by the image data generating unit 5 (step S2; see FIG. 15A). Subsequently, the binarizing unit 6b performs a binarization process where binarization is performed using a predetermined threshold value, on the image data of the captured image Ia obtained by the image obtaining unit 6a, and thereby generates image data of a binarized image Ib (step S3).

Then, the edge detecting unit 6g detects a plurality of edges E from within the binarized image Ib created by the binarizing unit 6b, and thereby generates image data of an edge image Ic (see FIG. 15C) (step S4).

Subsequently, the parallel edge extracting unit 6h sequentially applies a parallel edge filter F to the image data of the edge image Ic from a pixel in a predetermined position (e.g., an upper left corner portion), and thereby extracts two substantially parallel edges E and E (step S5; see FIGS. 16A and 16B).

Then, the read area identifying unit 6i identifies, as a read area A for the code information Sc, an area corresponding to a line formed by connecting the midpoints of the two substantially parallel edges E and E which are extracted by the parallel edge extracting unit 6h, in the binarized image Ib (step S6).

Subsequently, the information reading unit 6e performs a reading process for reading predetermined information from the code information Sc in the read area A identified by the read area identifying unit 6i in the binarized image Ib (step S7). Specifically, the information reading unit 6e performs scanning in a predetermined direction from a predetermined position (e.g., an upper left corner portion) of the read area A which is a line of a predetermined shape, to identify coordinate positions where a set of white pixels with the pixel value "1" and a set of black pixels with the pixel value "0" are present. Then, the information reading unit 6e performs a decoding process on an arrangement of the identified set of white pixels and set of black pixels, and thereby reads original predetermined information (e.g., a URL) represented by the code information Sc.

Note that to more efficiently perform a reading process by the information reading unit 6e, a projective transformation process that transforms an outline of the frame portion Sw into a square shape may be performed on the binarized image Ib before the reading process.

Subsequently, the information reading unit 6e determines whether the original predetermined information has been read a plurality of times from the code information Sc by the reading process (step S8).

Here, if it is determined that the original predetermined information has been read a plurality of times (step S8; YES), the information reading unit 6e determines that the predetermined information has been able to be read properly, and thus the operation processing unit 7 performs predetermined operation (e.g., accessing the Internet to play back specific audio and images), according to the predetermined information (e.g., a URL) read by the information reading unit 6e (step S9).

On the other hand, if it is determined at step S8 that the original predetermined information has not been read a plurality of times (step S8; NO), a CPU of the central control unit 1 skips the process at step S9 and ends the code reading process.

As described above, according to the portable terminal 300 of the present embodiment, a plurality of edges E are detected from a binarized image Ib of a captured image Ia where an imprint Si is captured. The imprint Si has code information Sc added to a frame portion Sw with a predetermined width around a predetermined mark image Sp. Based on two substantially parallel edges E and E, the space between which is substantially equal to the width of the frame portion Sw, which are extracted from among the plurality of edges E, . . . , a read area A for the code information Sc is identified in the binarized image Ib, and predetermined information is read from the code information Sc in the read area A. Thus, by using the edge shape of the frame portion Sw of the imprint Si affixed on a recording medium P, the read area A where the code information Sc is present can be identified properly in the binarized image Ib. Namely, since the code information Sc is present on the inner side of the frame portion Sw, by identifying two edges E and E of the frame portion Sw, the read area A for the code information Sc can also be identified properly in the binarized image Ib. Specifically, in the binarized image Ib, an area corresponding to an inner area between two edges E and E, more specifically, an area corresponding to a line formed by connecting the midpoints of two edges E and E, is identified as a read area A. Thus, the read area A can be identified more properly in the captured image Ia.

By this, since original predetermined information only needs to be read from the code information Sc in the read area A, predetermined information can be properly read from the captured image Ia.

In addition, when a predetermined number or more of pieces of the identical code information have been read from the captured image Ia of the imprint Si having a plurality of pieces of identical code information Sc added to the frame portion Sw, performance of processes for the predetermined information is controlled. Thus, by embedding multiple pieces of code information Sc, . . . in the frame portion Sw, original predetermined information can be stably read from the code information Sc, enabling to properly perform processes for the read predetermined information.

Note that the present invention is not limited to the above-described embodiment, and various modifications and design changes may be made thereto without departing from the spirit and scope of the present invention.

That is, a method for identifying a frame portion Sw may be any method as long as the method can identify a frame portion Sw from the captured image Ia, and read information from the identified frame portion Sw.

For example, in the above-described embodiment, a frame template image corresponding to a predetermined polygonal frame may be prepared, and a frame portion Sw may be identified by matching between the frame template image and a captured image Ia.

In addition, for example, in the above-described embodiment, as a read area A for code information Sc, an area corresponding to a line formed by connecting the midpoints of two substantially parallel edges E and E in the captured image Ia (binarized image Ib) is exemplified, but it is an example and thus the area is not limited thereto. The area can be arbitrarily changed where appropriate, as long as the area corresponds to an inner area between two substantially parallel edges E and E.

In addition, although in the above-described embodiment the shape of the frame portion Sw is square, it is an example and thus the shape is not limited thereto. The shape can be arbitrarily changed where appropriate, as long as the shape has a predetermined width. Namely, the shape of a frame portion Sw may be, for example, polygonal other than square or may be annular.

Furthermore, although in the above-described embodiment pieces of identical code information Sc are added to the sides Sa of the frame portion Sw of the imprint Si, respectively, it is an example and thus the configuration is not limited thereto. For example, different pieces of code information Sc may be added. In this case, the amount of code information (original predetermined information) Sc embedded in the frame portion Sw can be increased.

Furthermore, although in the above-described embodiment the portable terminal 300 is exemplified as an image processing apparatus, it is an example and thus the apparatus is not limited thereto. The apparatus can be arbitrarily changed where appropriate, as long as the apparatus can control performance of the process of reading code information Sc.

In addition, although in the above-described embodiment the configuration is such that the functions of an obtaining unit, a detecting unit, an extracting unit, an identifying unit, and a reading unit are implemented by the image obtaining unit 6a, the edge detecting unit 6g, the parallel edge extracting unit 6h, the read area identifying unit 6i, and the information reading unit 6e driving under the control of the central control unit 1 of the portable terminal 300, the configuration is not limited thereto. The configuration may be such that the functions are implemented by the CPU of the central control unit 1 executing a predetermined program, etc.

Namely, a program including an obtaining process routine, a detection process routine, an extraction process routine, an identification process routine, and a reading process routine is stored in a program memory that stores programs. Then, by the obtaining process routine, the CPU of the central control unit 1 may be allowed to function as a unit that obtains an imprint image where an imprint Si is captured. The imprint Si has pieces of code information Sc where predetermined information is encoded into a regular arrangement of a set of pixels, which are added to a frame portion Sw with a predetermined width around a predetermined mark image Sp. In addition, by the detection process routine, the CPU of the central control unit 1 may be allowed to function as a unit that detects a plurality of edges E from the obtained imprint image. In addition, by the extraction process routine, the CPU of the central control unit 1 may be allowed to function as a unit that extracts two substantially parallel edges E and E, the space between which is substantially equal to the width of the frame portion Sw, from among the detected plurality of edges E, . . . . In addition, by the identification process routine, the CPU of the central control unit 1 may be allowed to function as a unit that identifies a read area A for the code information Sc in the imprint image, based on the two extracted edges E and E. In addition, by the reading process routine, the CPU of the central control unit 1 may be allowed to function as a unit that reads predetermined information from the code information Sc in the identified read area A.

Likewise, the configuration may be such that a processing unit is also implemented by the CPU of the central control unit 1 executing a predetermined program, etc.

Furthermore, as a computer-readable medium storing a program for performing the above-described processes, in addition to ROM, a hard disk, etc., portable recording media such as nonvolatile memory, e.g., flash memory, and a CD-ROM can also be applied. In addition, as a medium that provides program data through a predetermined communication line, a carrier wave is also applied.

What is claimed is:

1. An image processing apparatus comprising:
an obtaining unit configured to obtain an imprint image where an imprint is captured, the imprint having code information added to a frame portion;
an identifying unit configured to identify a frame image area as a read area where the code information is read, the frame image area corresponding to an imprint of the frame portion in the imprint image obtained by the obtaining unit; and
a reading unit configured to read the code information from the read area identified by the identifying unit,
wherein the identifying unit includes
a detecting unit configured to detect a plurality of edges from the imprint image obtained by the obtaining unit, and
an extracting unit configured to extract two substantially parallel edges, space between which is substantially equal to a width of the frame portion, from among the plurality of edges detected by the detecting unit,
wherein the identifying unit identifies a read area for the code information in the imprint image, based on the two edges extracted by the extracting unit, and
wherein the reading unit reads information from the code information in the read area identified by the identifying unit.

2. The image processing apparatus according to claim 1, wherein the identifying unit identifies, in the imprint image, an area corresponding to an inner area sandwiched between the two edges, as the read area.

3. The image processing apparatus according to claim 1, wherein
the code information is added on a substantially center side in a width direction of the frame portion and in an orthogonal direction substantially orthogonal to the width direction, and
the identifying unit identifies, in the imprint image, an area corresponding to a line formed by connecting midpoints of the two edges, as the read area.

4. The image processing apparatus according to claim 1, wherein
a plurality of pieces of identical code information are added to the frame portion, and
the image processing apparatus further comprises a processing unit configured to control, when the reading unit has read a predetermined number or more of pieces of the identical code information, performance of a process for the information.

5. The image processing apparatus according to claim 1, wherein
the identifying unit includes
an estimating unit configured to estimate a predetermined number of straight lines in the imprint image obtained by the obtaining unit, the straight lines forming an external contour of the frame portion and provided according to a number of corners of a polygonal frame, and
a detecting unit configured to detect the frame portion of the imprint image, the frame portion being formed of the predetermined number of straight lines estimated by the estimating unit.

6. The image processing apparatus according to claim 5, wherein
the estimating unit includes
a contour identifying unit configured to identify a polygonal area corresponding to the external contour of the frame portion of the imprint image obtained by the obtaining unit, and
a straight line identifying unit configured to identify the plurality of number of straight lines forming the external contour of the frame portion, based on positions of a plurality of vertices forming the polygonal area identified by the contour identifying unit.

7. The image processing apparatus according to claim 6, wherein the straight line identifying unit identifies the predetermined number of straight lines forming the external contour of the frame portion, based on at least either one of a number of pixels of each straight line overlapping the polygonal area among a plurality of straight lines, and a relative relationship between adjacent straight lines, the plurality of straight lines passing through any two vertices forming the polygonal area identified by the contour identifying unit.

8. The image processing apparatus according to claim 7, wherein the straight line identifying unit further identifies a straight line whose number of pixels overlapping a plurality of pixels forming the polygonal area is greater than a predetermined value among the plurality of straight lines, and identifies the straight line as a straight line forming the external contour of the frame portion, the plurality of straight lines passing through any two vertices forming the polygonal area identified by the contour identifying unit.

9. The image processing apparatus according to claim 7, wherein the straight line identifying unit further identifies a straight line whose angle formed with a straight line adjacent thereto is substantially equal to an interior angle of the polygonal frame among the plurality of straight lines, calculates an evaluation value for each straight line by assigning a weight to a pixel among pixels forming the straight line that overlaps the polygonal area, and identifies a straight line whose calculated evaluation value is high, as a straight line forming the external contour of the frame portion, the plurality of straight lines passing through any two vertices forming the polygonal area identified by the contour identifying unit.

10. The image processing apparatus according to claim 6, wherein the detecting unit
includes a vertex identifying unit configured to identify, as vertices of the frame portion, a predetermined number of points where the predetermined number of straight lines identified by the straight line identifying unit intersect each other, and
detects the frame portion of the imprint image, based on the predetermined number of vertices identified by the vertex identifying unit.

11. The image processing apparatus according to claim 10, wherein
the imprint has markers of a predetermined shape formed at corners of the polygonal frame, and
the vertex identifying unit further identifies positions of marker images corresponding to the markers, in the imprint image obtained by the obtaining unit, and identifies the vertices of the frame portion, based on the identified positions of the marker images.

12. The image processing apparatus according to claim 11, further comprising a first creating unit configured to create a polygonal imprint image by performing a projective transformation process on the imprint image obtained by the obtaining unit, based on the predetermined number of vertices identified by the vertex identifying unit, wherein
the detecting unit detects a frame portion corresponding to a frame of the polygonal imprint image created by the first creating unit.

13. The image processing apparatus according to claim 5, further comprising a reading unit configured to read information from the code information in the frame portion of the imprint image detected by the detecting unit.

14. The image processing apparatus according to claim 5, further comprising a number-of-pixel reducing unit configured to perform a process on the imprint image obtained by the obtaining unit, to relatively reduce a number of pixels present on a background of the imprint image, wherein the estimating unit estimates the predetermined number of straight lines in the imprint image processed by the number-of-pixel reducing unit.

15. The image processing apparatus according to claim 1, wherein
a plurality of pieces of code information are added to a polygonal frame of the imprint, and
the image processing apparatus further comprises a processing unit configured to control, when the reading unit has read a predetermined number or more of pieces of the identical code information, performance of a process for the information.

16. The image processing apparatus according to claim 1, wherein a frame is substantially annular,
the image processing apparatus further includes a mark identifying unit configured to identify a mark formed in an annular portion in the image obtained by the obtaining unit, and
the reading unit reads the code information, based on the mark identified by the mark identifying unit.

17. The image processing apparatus according to claim 16, further comprising a second creating unit configured to create an image where the annular portion is transformed into a perfect circular shape, by performing a projective transformation process on the image obtained by the obtaining unit, with reference to a position of the mark identified by the mark identifying unit.

18. The image processing apparatus according to claim 1, wherein the code information includes at least one of a URL for accessing a predetermined server, various types of images, and a predetermined character string.

19. An image processing method using an image processing apparatus, the method comprising the steps of:
obtaining an imprint image where an imprint is captured, the imprint having code information added to a frame portion;
identifying a frame image area as a read area where the code information is read, the frame image area corresponding to an imprint of the frame portion in the obtained imprint image; and
reading the code information from the identified read area, wherein the identifying step includes
detecting a plurality of edges from the imprint image obtained by the obtaining step, and
extracting two substantially parallel edges, space between which is substantially equal to a width of the frame portion, from among the plurality of edges detected by the detecting step,
wherein the identifying step identifies a read area for the code information in the imprint image, based on the two edges extracted by the extracting step, and
wherein the reading step reads information from the code information in the read area identified by the identifying step.

20. A non-transitory computer readable recording medium recording a program that causes a computer of an image processing apparatus to function as:
an obtaining unit configured to obtain an imprint image where an imprint is captured, the imprint having code information added to a frame portion;
an identifying unit configured to identify a frame image area as a read area where the code information is read, the frame image area corresponding to an imprint of the frame portion in the imprint image obtained by the obtaining unit; and
a reading unit configured to read the code information from the read area identified by the identifying unit, wherein the identifying unit includes
a detecting unit configured to detect a plurality of edges from the imprint image obtained by the obtaining unit, and
an extracting unit configured to extract two substantially parallel edges, space between which is substantially equal to a width of the frame portion, from among the plurality of edges detected by the detecting unit,
wherein the identifying unit identifies a read area for the code information in the imprint image, based on the two edges extracted by the extracting unit, and
wherein the reading unit reads information from the code information in the read area identified by the identifying unit.

21. An image processing apparatus comprising:
an obtaining unit configured to obtain an imprint image where an imprint is captured, the imprint having code information added to a frame portion;
an identifying unit configured to identify a frame image area as a read area where the code information is read, the frame image area corresponding to an imprint of the frame portion in the imprint image obtained by the obtaining unit;
a reading unit configured to read the code information from the read area identified by the identifying unit; and
a processing unit configured to control, when the reading unit has read a predetermined number or more of pieces of the identical code information, performance of a process for the information,
wherein a plurality of pieces of identical code information are added to the frame portion.

22. An image processing apparatus comprising:
an obtaining unit configured to obtain an imprint image where an imprint is captured, the imprint having code information added to a frame portion;
an identifying unit configured to identify a frame image area as a read area where the code information is read, the frame image area corresponding to an imprint of the frame portion in the imprint image obtained by the obtaining unit; and
a reading unit configured to read the code information from the read area identified by the identifying unit;
wherein the identifying unit includes:
an estimating unit configured to estimate a predetermined number of straight lines in the imprint image obtained by the obtaining unit, the straight lines forming an external contour of the frame portion and provided according to a number of corners of a polygonal frame, and
a detecting unit configured to detect the frame portion of the imprint image, the frame portion being formed of the predetermined number of straight lines estimated by the estimating unit.

23. An image processing apparatus comprising:
an obtaining unit configured to obtain an imprint image where an imprint is captured, the imprint having code information added to a frame portion;
an identifying unit configured to identify a frame image area as a read area where the code information is read, the frame image area corresponding to an imprint of the frame portion in the imprint image obtained by the obtaining unit; and
a reading unit configured to read the code information from the read area identified by the identifying unit; and
a processing unit configured to control, when the reading unit has read a predetermined number or more of pieces of the identical code information, performance of a process for the predetermined information,
wherein a plurality of pieces of code information are added to a polygonal frame of the imprint.

24. An image processing apparatus comprising:
an obtaining unit configured to obtain an imprint image where an imprint is captured, the imprint having code information added to a frame portion;
an identifying unit configured to identify a frame image area as a read area where the code information is read, the frame image area corresponding to an imprint of the frame portion in the imprint image obtained by the obtaining unit; and
a reading unit configured to read the code information from the read area identified by the identifying unit;
wherein:
a frame is substantially annular,
the image processing apparatus further includes a mark identifying unit configured to identify a mark formed in an annular portion in the image obtained by the obtaining unit, and
the reading unit reads the code information, based on the mark identified by the mark identifying unit.

* * * * *